US012181866B2

(12) United States Patent
Fridley et al.

(10) Patent No.: US 12,181,866 B2
(45) Date of Patent: Dec. 31, 2024

(54) SYSTEMS AND METHODS FOR PREDICTING MANUFACTURING PROCESS RISKS

(71) Applicant: C3.ai, Inc., Redwood City, CA (US)

(72) Inventors: Lila Fridley, Redwood City, CA (US); Henrik Ohlsson, Redwood City, CA (US); Sina Khoshfetrat Pakazad, Redwood City, CA (US)

(73) Assignee: C3.ai, Inc., Redwood City, CA (US)

( * ) Notice: Subject to any disclaimer, the term of this patent is extended or adjusted under 35 U.S.C. 154(b) by 0 days.

(21) Appl. No.: 17/688,722

(22) Filed: Mar. 7, 2022

(65) Prior Publication Data
US 2022/0260988 A1 Aug. 18, 2022

Related U.S. Application Data

(63) Continuation of application No. PCT/US2020/050274, filed on Sep. 10, 2020.
(Continued)

(51) Int. Cl.
*G05B 23/02* (2006.01)
*G05B 13/04* (2006.01)

(52) U.S. Cl.
CPC ....... *G05B 23/0294* (2013.01); *G05B 13/048* (2013.01); *G05B 23/024* (2013.01); *G05B 23/027* (2013.01)

(58) Field of Classification Search
CPC .............. G05B 23/0294; G05B 23/024; G05B 23/027; G05B 13/048
(Continued)

(56) References Cited

U.S. PATENT DOCUMENTS

2005/0203807 A1* 9/2005 Bezos ................... G06Q 50/01
  705/26.61
2017/0032281 A1 2/2017 Hsu
(Continued)

FOREIGN PATENT DOCUMENTS

EP 3336638 A1 6/2018
JP 2006350698 A 12/2006
(Continued)

OTHER PUBLICATIONS

PCT/US2020/050274 International Preliminary Report on Patentability dated Mar. 15, 2022.
(Continued)

*Primary Examiner* — Jigneshkumar C Patel
(74) *Attorney, Agent, or Firm* — Norton Rose Fulbright US LLP

(57) ABSTRACT

The present disclosure provides system, methods, and computer program products for predicting and detecting anomalies in a subsystem of a system. An example method may comprise (a) determining a first plurality of tags that are indicative of an operational performance of the subsystem. The tags can be obtained from (i) a plurality of sensors in the subsystem and (ii) a plurality of sensors in the system that are not in the subsystem. The method may further comprise (b) processing measured values of the first plurality of tags using an autoencoder trained on historical values of the first plurality of tags to generate estimated values of the first plurality of tags; (c) determining whether a difference between the measured values and estimated values meets a threshold; and (d) transmitting an alert that indicates that the subsystem is predicted to experience an anomaly if the difference meets the threshold.

20 Claims, 19 Drawing Sheets

Related U.S. Application Data

(60) Provisional application No. 62/899,081, filed on Sep. 11, 2019.

(58) Field of Classification Search
USPC .......................................................... 700/108
See application file for complete search history.

(56) References Cited

U.S. PATENT DOCUMENTS

| | | |
|---|---|---|
| 2018/0144243 A1 | 5/2018 | Hsieh et al. |
| 2018/0261100 A1* | 9/2018 | Rachmawati ........... B63B 49/00 |
| 2018/0270620 A1 | 9/2018 | Tolman |
| 2018/0314985 A1* | 11/2018 | O'Shea .................. G06N 3/045 |
| 2019/0235484 A1 | 8/2019 | Ristovski et al. |
| 2020/0133820 A1* | 4/2020 | Olson .................. G06F 11/008 |
| 2020/0218800 A1* | 7/2020 | Sun ........................ G06F 21/552 |

FOREIGN PATENT DOCUMENTS

| | | |
|---|---|---|
| JP | 2017207904 A | 11/2017 |
| JP | 2018169748 A | 11/2018 |
| JP | 2018181052 A | 11/2018 |
| JP | 2018190050 A | 11/2018 |
| JP | 2019020982 A | 2/2019 |
| WO | WO-2018230645 A1 | 12/2018 |
| WO | WO-2021050790 A1 | 3/2021 |

OTHER PUBLICATIONS

PCT/US2020/050274 International Search Report and Written Opinion dated Jan. 7, 2021.
European Patent Office, Extended Search Report issued for European Patent Application No. 20862231.6, dated Aug. 18, 2023, 8 pages.
Japanese Patent Office, Office Action issued for Japanese Patent Application No. 2022-515886, dated Sep. 2, 2024, 10 pages.

* cited by examiner

FIG. 5

| Overview > Desalter-DS17: High Risk | | | | |
|---|---|---|---|---|
| Desalter-DS17: High Risk ...<br>Desalter-DS17 • Distillation<br>Alert ID<br>[Open Case] [Create Work Order] | Reliability Risk<br>94<br>▲4 (4.5%)<br>Last 7 days | | Date Triggered<br>Jun 11, 2019 | Status<br>New |

Reliability Risk Score Summary — View Desalter-DS17

○ Temperature (40%)  ○ Pressure (20%)  ○ Vibration (15%)  ○ Other Features (25)

All Contributors ...

| Contributor | Contribution Level | Value |
|---|---|---|
| ▸ Temperature | 40% | 150°C |
| ▸ Pressure | 20% | 1000 psi |
| ▸ Vibration | 15% | 2.0 Hz |
| ▸ Feature Name | 10% | 85.5 |
| ▸ Feature Name | 5% | 95.6 |
| ▸ Feature Name | 4% | 68.3 |
| ▸ Feature Name | 3% | 80.1 |
| ▸ Feature Name | 3% | 74.3 |

Suggested Failure Modes

| Bearing Failure | Seal Failure | Vibration Failure | Fatigue Failure | Widget Failure |
|---|---|---|---|---|
| Mechanical | Mechanical | Mechanical | Mechanical | Mechanical |
| The two Montreal artists effortlessly conjure peaceful seaside climes on this eight... | The two Montreal artists effortlessly conjure peaceful seaside climes on this eight... | The two Montreal artists effortlessly conjure peaceful seaside climes on this eight... | The two Montreal artists effortlessly conjure peaceful seaside climes on this eight... | The two Montreal artists effortlessly conjure peaceful seaside climes on this eight... |

| | All Systems > Distillation > Desalter-DS17 | | | | | |
|---|---|---|---|---|---|---|
| Overview | Desalter-DS17 ⚑ ⋯ Subsystem Location Subsystem description onec facilisis tortor ut augue lacinia, at viverra est semper. Sed sapien metus, sceler tempor a tortor... | System Reliability Risk Score 94 ▲4 (4.5%) Last 7 days | Total Open AI Alerts 5 ▲2 (4.5%) Last 7 days | Total Tag Clusters 218 | | |
| Alerts | | | | | | |
| Cases | | | | | | |
| Systems | Analysis  Alerts  Cases  Work Orders  Tag Clusters  Diagram | | | | | |
| Analysis | | | | | | |
| Settings | Filter ✱ | 🔍 Search... | | | | ⋯ |
| | •Status        Clear ☑ Unassigned ☑ Assigned ☐ Reviewed ☐ Closed | Name ◆ | Priority◆ | Status◆ | Assignee◆ | Creation Date◆ | Last Activity◆ |
| | | Case 93 Desalter-DS17 | P0 | Assigned | Dana C. | Jun 11, 2019 1 day open | Case Assigned Jun 11, 2019 |
| | | Case 50 Desalter-DS17 | P0 | In Review | Dana C. | Jun 6, 2019 5 days open | Comment Added Jun 10, 2019 |
| | •Date Created  Clear Start 📅 Select Time... ⇅ End 📅 Select Time... ⇅ | Case 55 Desalter-DS17 | P0 | Assigned | Dana C. | Jun 6, 2019 5 days open | Attachment Uploaded Jun 10, 2019 |
| | | Case 23 Desalter-DS17 | P1 | Assigned | Jack B. | Jun 5, 2019 6 days open | Comment Added Jun 10, 2019 |
| | | Case 31 Desalter-DS17 | P1 | Assigned | Jack B. | Jun 5, 2019 6 days open | Attachment Uploaded Jun 10, 2019 |
| 🔔 | •People        Clear Search Name  ▾ | Case 72 Desalter-DS17 | P1 | Assigned | Dana C. | Jun 5, 2019 6 days open | Attachment Uploaded Jun 09, 2019 |
| ⓉⓈ | | Case 37 Desalter-DS17 | P1 | Assigned | Lisa X. | Jun 4, 2019 7 days open | Comment Added Jun 08, 2019 |
| | | Case 61 Desalter-DS17 | P1 | Assigned | Dana C. | Jun 4, 2019 7 days open | Priority Changed Jun 08, 2019 |
| | | Case 32 Desalter-DS17 | P2 | Assigned | Lisa X. | Jun 4, 2019 7 days open | Priority Changed Jun 05, 2019 |
| | | Case 60 Desalter-DS17 | P1 | Assigned | Jim T. | Jun 4, 2019 7 days open | Comment Added Jun 08, 2019 |
| | [Filter] [Cancel] | Rows per page: 10 ▾  1-10 of many | | | | | ⏮ ◀ 1 2 ▶ ⏭ |

Systems

Systems Summary

| Systems with AI Alerts | Subsystems with AI Alerts | Highest Risk Subsystems | Total Open AI Alerts |
|---|---|---|---|
| 10 / 12 | 36 / 72 | Subsystem Name<br>Subsystem Name<br>Subsystem Name<br>Subsystem Name | 44<br>- 4 (10%)<br>Last 7 days |

Systems (12)

🔍 Search...

| System ◆ | Reliability Risk ◆ | Active Alerts ◆ | Open Cases ◆ | Region ◆ |
|---|---|---|---|---|
| Distillation | 88 | 3 | 3 | Location |
| Hydrotreatment | 75 | 2 | 4 | Location |
| Catalytic Cracking | 80 | 4 | 3 | Location |
| Sulfur Recovery | 77 | 6 | 7 | Location |
| Isomerization | 82 | 8 | 6 | Location |
| Fractionation | 60 | 1 | 1 | Location |
| Steam Cracking | 61 | 3 | 9 | Location |
| Reforming | 70 | 5 | 8 | Location |
| Coking | 59 | 7 | 2 | Location |
| Distillation | 68 | 9 | 5 | Location |

Rows per page: 10 ▾    1-10 of 12    ⏮ ◀ 1 2 ▶ ⏭

FIG. 13

| | All Systems › Distillation | | | | |
|---|---|---|---|---|---|
| Overview | Distillation — System Location — System description onec facilisis tortor ut augue lacinia, at viverra est semper. Sed sapien metus, sceler tempor a tortor ... | | System Reliability Risk Score 88 ▲8 (10%) Last 7 days | Highest Risk Subsystems Subsystem Name Subsystem Name Subsystem Name | Total Open AI Alerts 6 ▼2 (5%) Last 7 days |
| Alerts | Subsystems  Subsystem Alerts  Subsystem Cases  Work Orders | | | | |
| Cases | | | | | |
| Systems | ◁ Subsystems (12) | | | | |
| Analysis | Subsystem • | Reliability Risk • | Active Alerts • | Open Cases • | Last Activity • |
| Settings | Desalter-DS17 | 88 | 5 | 1 | Case Opened Jun 11, 2019 |
| | LPG-LGP86 | 75 | 2 | 0 | Alert Closed Jun 5, 2019 |
| | Atm Distillation-AS65 | 91 | 4 | 0 | Alert Closed Jun 5, 2019 |
| | Feed-F33 | 77 | 6 | 0 | Alert Closed Jun 3, 2019 |
| | Desalter-DS13 | 89 | 8 | 1 | Case Opened Jun 3, 2019 |
| | Feed-F26 | 60 | 1 | 0 | Location Jun 5, 2019 |
| | Heat-H41 | 61 | 3 | 0 | Alert Closed Jun 8, 2019 |
| | LPG-LGP87 | 87 | 5 | 0 | Alert Created Jun 5, 2019 |
| | LPG-LGP82 | 59 | 7 | 0 | Alert Closed Jun 3, 2019 |
| | Heat-H55 | 86 | 9 | 1 | Cased Opened Jun 5, 2019 |
| | Rows per page: 10 ▾  1-10 of 12 | | | | ⋈ ◂ 1 2 ▸ ⋈ |

FIG. 14

| | All Systems ▸ Distillation | | | | |
|---|---|---|---|---|---|
| ▦ Overview | Distillation 🔲 ⋯ | | System Reliability Risk Score 88 ▼8 (10%) Last 7 days | | Highest Risk Subsystems Subsystem Name Subsystem Name Subsystem Name | Total Open AI Alerts 6 ▼2 (5%) Last 7 days |
| + Alerts | System Location System description onec facilisis tortor ut augue lacinia, at viverra est semper. Sed sapien metus. sceler tempor a tortor ... | | | | |
| ◇ Cases | Subsystems Subsystem Alerts Subsystem Cases Work Orders | | | | |
| ⌂ Systems | | | | | |
| ⚙ Analysis | Filter ⊗ | 🔍 Search... | | | |
| ⚙ Settings | ▼ Status Clear | Name ◆ | Subsystem ◆ | Reliability Risk ◆ | Date Triggered ▲ | Status ◆ |
| | ☑ Open | Desalter-DS17: High Risk Alert ID | Desalter-DS17 | (94) | Jun 11, 2019 07:23:17 PM PST | Case Created |
| | ☐ Case Created ☐ Closed | Feed-F22: High Risk Alert ID | Feed-F22 | (93) | Jun 11, 2019 07:23:17 PM PST | Case Created |
| | ▼ Date Triggered Clear Start | Desalter-DS07: High Risk Alert ID | Desalter-DS07 | (93) | Jun 11, 2019 07:23:17 PM PST | Case Created |
| | ⊙ Select Time... ◆ End | LPG-LGP97: Medium Risk Alert ID | LPG-LGP97 | (92) | Jun 11, 2019 07:23:17 PM PST | Open |
| | ⊙ Select Time... ◆ | LPG-LGP100: Medium Risk Alert ID | LPG-LGP100 | (91) | Jun 08, 2019 04:44:13 PM PST | Open |
| | ▼ Reliability Risk Clear | Heat-H42: High Risk Alert ID | Heat-H42 | (90) | Jun 08, 2019 04:44:13 PM PST | Open |
| | ☑ High ☑ Medium | LPG-LGP85: High Risk Alert ID | LPG-LGP85 | (89) | Jun 08, 2019 04:44:13 PM PST | Open |
| | ☑ Low | Feed-F20: High Risk Alert ID | Feed-F20 | (85) | Jun 08, 2019 04:44:13 PM PST | Open |
| | ⌘ Filter [Cancel] | Rows per page: 8 ▼ 1-8 of 14 | | | | ⟨ ⟨ 1 ⟩ ⟩ |

SYSTEMS AND METHODS FOR PREDICTING MANUFACTURING PROCESS RISKS

CROSS-REFERENCE

This application is a continuation application of International Patent Application PCT/US2020/050274, filed Sep. 10, 2020, which claims the benefit of U.S. Provisional Patent Application No. 62/899,081, filed Sep. 11, 2019, each of which is incorporated herein by reference in its entirety.

BACKGROUND

Manufacturers may rely on a framework of scheduled and reactive maintenance to manage their operating assets. This may result in lost revenue from deferred production, excess costs associated with unplanned maintenance actions, shortened asset life, poor product quality, and personnel safety risks associated with increased exposure in the field.

SUMMARY

The present disclosure provides systems, methods, and computer program products for predicting and detecting anomalies in a system or subsystem of a processing pipeline to improve the reliability of the processing pipeline. The processing pipeline may be, for example, an oil and gas processing pipeline that includes drilling assets, refining assets, and pipeline assets (e.g., pumps, compressors, heat exchangers, and valves). A system for predicting and detecting anomalies as described herein can be implemented on one or more computers in one or more locations. The computers can store instructions that, upon execution, cause the computers to predict an anomaly in a subsystem of a system.

The system can determine a first plurality of tags that are indicative of an operational performance of the subsystem. The first plurality of tags may include time series data from sensors in the subsystem. The first plurality of tags may additionally include time series data from sensors in the system that are not in the subsystem but are nonetheless indicative of the operational performance of the subsystem. For example, the first plurality of tags may be from another subsystem that provides input to the subsystem, receives output from the subsystem, or is otherwise correlated with the subsystem. The system can identify the first plurality of tags using one or more machine learning methods. For example, the system can use a clustering algorithm to identify the first plurality of tags from all of the tags in the system. Determining the first plurality of tags may be considered a feature-selection operation.

The system can process measured values of the first plurality of tags using an autoencoder. The autoencoder can have an encoder that is configured to generate, from the measured values, a reduced-dimension or compressed output. The autoencoder can additionally have a decoder that is configured to generate estimated values of the first plurality of tags from the reduced-dimension or compressed output. The autoencoder can be trained on historical values of the first plurality of tags.

The system can determine whether there is a difference between the measured values of the first plurality of tags provided to the autoencoder and the estimated values of the first plurality of tags generated by the autoencoder. If the measured values and the estimated values are the same or similar, the system may determine that the subsystem is not experiencing an anomaly. If, on the other hand, the system determines that the difference between the measured values and the estimated values meets a threshold, the system may determine that the subsystem is experiencing an anomaly. The system can transmit an alert that indicates that the system is experiencing such an anomaly.

Whereas many manufacturing entities rely on scheduled or reactive maintenance to manage operating assets, the system described above can accurately predict failures and detect anomalies in a processing pipeline before they occur by using data from hundreds to thousands of sensors and identifying correlations in that data. Because steps in a process may be highly interdependent, the correlations identified by the system described herein can be useful in identifying anomalies. Additionally, the system can use machine learning models that can be retrained on new failure events to increase prediction and detection accuracy over time. Finally, the system can predict failures and detect anomalies at the asset, system, or subsystem level, which can enable users to quickly perform predictive maintenance on the processing pipeline to maintain safety, extend asset life, produce higher quality products, and avoid costly downtime.

The present disclosure can additionally provide applications and user interfaces that enable users, e.g., operations managers or engineers, to interact with and view the outputs of the system described above. The applications and user interfaces can additionally enable the users to monitor, control, and perform predictive maintenance on assets in a processing pipeline.

These applications and user interfaces may provide an end-to-end solution for prioritizing, investigating, and responding to predicted or detected anomalies in a processing pipeline.

In an aspect, the present disclosure provides a method for predicting an anomaly in a subsystem of a system. The method may comprise determining a first plurality of tags that are indicative of an operational performance of the subsystem. Each tag of the first plurality of tags may comprise a data series, and the first plurality of tags can be obtained from (i) a plurality of sensors in the subsystem and (ii) a plurality of sensors in the system that are not in the subsystem. The method may further comprise processing measured values of the first plurality of tags with an autoencoder by (1) generating a compressed representation of the measured values and (2) de-coding the compressed representation of the measured values into estimated values of the first plurality of tags, wherein the autoencoder has been trained on historical values of the first plurality of tags. The method may further comprise determining whether a difference between the measured values and the estimated values meets a threshold and transmitting an alert that indicates that the subsystem is predicted to experience an anomaly if the difference meets the threshold.

In some implementations, (a) comprises processing, using an unsupervised learning algorithm, data from sensors in the system to generate a plurality of groups of tags, the plurality of groups of tags comprising the first plurality of tags that are indicative of the operational performance of the subsystem. In some implementations, each tag of the first plurality of tags is correlated with at least one other tag of the first plurality of tags or with the operational performance of the subsystem. In some implementations, the unsupervised learning algorithm is a clustering algorithm. The clustering algorithm may be a k-means clustering algorithm, a cosine similarity algorithm, a topological data analysis algorithm, or a hierarchical density-based spatial clustering of applications with noise (HDB-SCAN).

In some implementations, (a) is performed offline.

In some implementations, the method further comprises, prior to (c), applying weights to each of the measured values and the estimated values.

In some implementations, the method further comprises dynamically adjusting the threshold during operation of the system.

In some implementations, the method further comprises determining whether a difference between a measured value of a respective tag and the estimated value of the respective tag meets a tag threshold and transmitting an alert if the difference meets the tag threshold.

In some implementations, the autoencoder is a deep neural network or a 1-class support vector machine (SVM).

In some implementations, the historical data comprises data series collected in a time period during which no failures occurred in the subsystem.

In some implementations, the system comprises a plurality of subsystems.

In some implementations, the measured values of the first plurality of tags comprise data series collected during a predetermined lookback horizon. In some implementations, the method further comprises dynamically adjusting the lookback horizon.

In some implementations, the method further comprises generating a risk score for the subsystem based on a magnitude of the difference between the measured values of the first plurality of tags and the estimated values of the first plurality of tags.

In some implementations, the alert comprises an email or text message. In some implementations, the alert can comprise a notification in a mobile or web application. In some implementations, the mobile or web application is configured to enable a user to perform one or more corrective actions for said subsystem.

In some implementations, the method further comprises determining an action to correct the anomaly in the subsystem using a trained machine learning algorithm. The trained machine learning algorithm can be been trained on historical human-initiated actions and corresponding responses by the subsystem. In some implementations, the method further comprises determining an action to correct the anomaly in the subsystem using rules-based logic based on engineering principles to correlate observed patterns in tag measurements to known failure mechanisms for processes and equipment in the subsystem.

In some implementations, the alert comprises a numerical risk score that indicates a likelihood that the anomaly will occur. The numerical risk score can be based at least in part on a magnitude of difference between the measured values of the first plurality of tags and the estimated values of the first plurality of tags. In some implementations, the alert comprises a numerical risk score that indicates a likelihood that the anomaly will occur. The numerical risk score can be based at least in part on how much the difference exceeds the threshold. In some implementations, the alert comprises a list of tags of the first plurality of tags that contributed most to the alert.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 4 through FIG. 18 show user interfaces of an application that can enable users to investigate alerts and generate and manage cases and word orders associated with such alerts;

FIG. 20 shows a computer system that is programmed or otherwise configured to implement methods provided herein.

DETAILED DESCRIPTION

Figure 1:
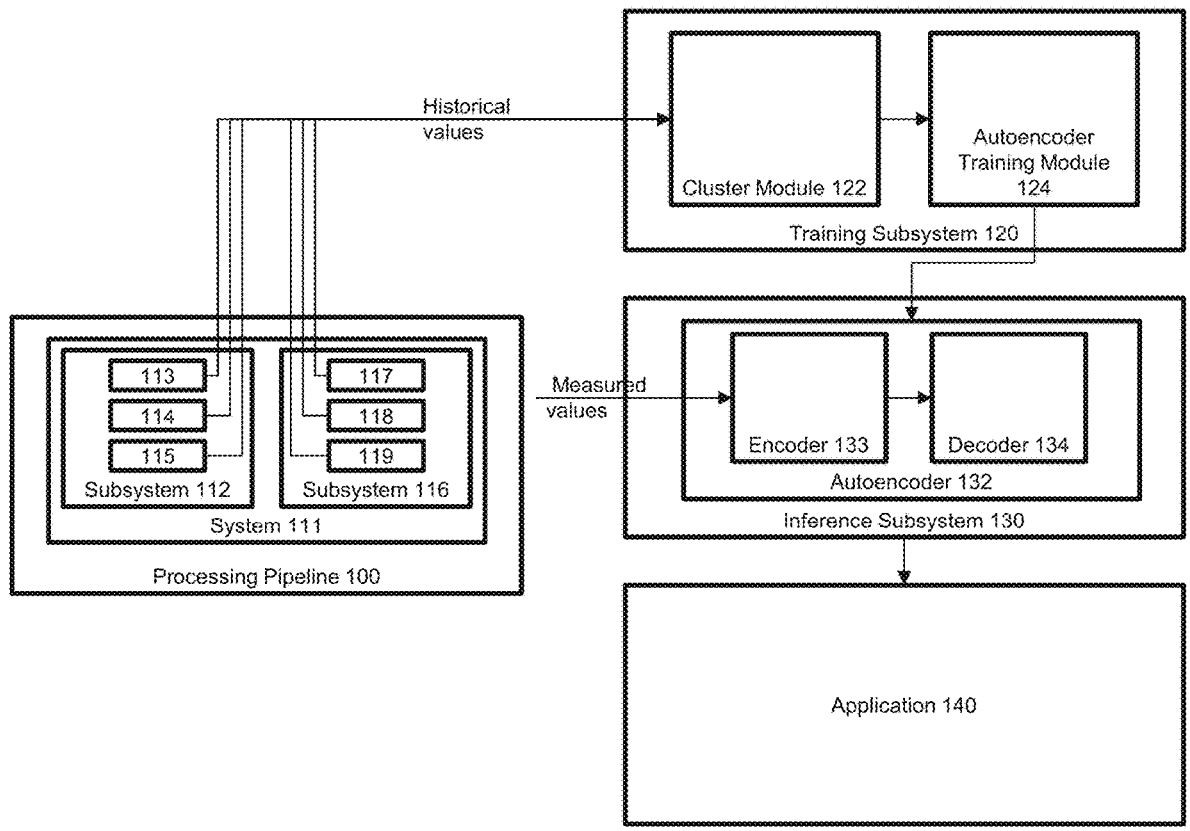
FIG. 1 schematically illustrates a system for predicting and detecting anomalies.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "asset," as used herein, generally refers to a single piece of equipment (e.g., a valve), in a processing pipeline.

The term "system," as used herein, generally refers to a collection of subsystems that perform a chemical reaction or a physical operation in a manufacturing process. Relationships between systems can be linear.

The term "subsystem," as used herein, generally refers to a collection of assets or a collection of smaller subsystems that perform a chemical reaction or a physical operation that occurs on the material in the process. Relationships between subsystems can be linear or hierarchical.

The term "platform," as used herein, generally refers to a large offshore structure for exploring, extracting, and processing petroleum and natural gas from beneath the seabed.

The term "plant," as used herein, generally refers to a facility where an industrial manufacturing process takes place.

The term "tag," as used herein, generally refers to an individual data series associated with a measurement on an asset (e.g., a pressure, temperature, or flow rate).

The term "cluster," as used herein, generally refers to a correlated group of tags that are associated with a single subsystem.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The present disclosure provides systems, methods, and computer program products for predicting and detecting anomalies in a system or subsystem of a processing pipeline to improve the reliability of the processing pipeline. An example system as described herein can determine a first plurality of tags that are indicative of an operational performance of the subsystem. The first plurality of tags may be time series data from sensors in the subsystem and sensors that are not in the subsystem but are nonetheless indicative of the operational performance of the subsystem. The system can determine that the first plurality of tags are indicative of the operational performance of the subsystem by using a clustering algorithm, for example. Determining the tags may be considered a feature-selection operation.

The system can process measured values of the first plurality of tags using an autoencoder. The autoencoder can have an encoder that is configured to generate, from the measured values, a reduced-dimension or compressed output and a decoder that is configured to generate estimated values of the first plurality of tags. The autoencoder can be trained on historical values of the first plurality of tags.

The system can determine whether there is a difference between the measured values of the first plurality of tags provided to the autoencoder and the estimated values of the first plurality of tags generated by the autoencoder. If the measured values and the estimated values are the same or similar, the system may determine that the subsystem is not experiencing an anomaly. If, on the other hand, the system determines that the difference between the measured values and the estimated values meets a threshold, the system may determine that the subsystem is experiencing an anomaly. The system can transmit an alert that indicates that the system is experiencing such an anomaly to one or more computing devices that have an application (e.g., a web application, mobile application, or dedicated software program). The application can enable users, e.g., engineers or operations managers, to monitor and investigate alerts, generate cases to track action items on the alerts, and generate work orders to address malfunctions underlying the alerts.

FIG. 1 schematically illustrates a system for predicting and detecting anomalies. The system can have a processing pipeline 100. The processing pipeline 100 can be located in a manufacturing facility, e.g., a plant. Alternatively, the processing pipeline 100 can be distributed among assets in different locations that are connected by conduits. The processing pipeline 100 can be configured to produce one or more products from one or more raw materials. The processing pipeline 100 can implement a batch, semi-batch, or continuous process. A batch process may be a process that produces a definite quantity of a product. A continuous process can be a process that produces an indefinite amount of a product while continuously consuming raw materials.

The processing pipeline 100 may be an oil and gas processing pipeline. Alternatively, the processing pipeline 100 can be a chemical or material synthesis pipeline (e.g., a pipeline for synthesis of paint, fertilizer, textiles, rubber, steel, or aluminum), a drug synthesis pipeline, or a food or beverage production pipeline.

The processing pipeline 100 may have a system 111. The system 111 may have a subsystem 112 and a subsystem 116. Each subsystem may have assets, e.g., individual components or pieces of equipment (not depicted) and sensors. An example of a system in an oil and gas processing pipeline is a crude distillation unit. The crude distillation unit may include coker, hydrocracker, catalytic converter, hydrotreater, reformer, and desulfurizer subsystems, and each subsystem may have assets. Although the processing pipeline 100 is depicted as having only a single system, the processing pipeline 100 can have multiple systems with multiple subsystems each.

The sensors in the processing pipeline 100 may be sensors that generate time-series data. The sensors may be thermometers, pressure gauges, flow meters, accelerometers, magnetometers, and the like. In addition to such time-series data, the sensors can generate metadata, e.g., data about the sensors' locations within the system 111 or the subsystems 112 and 166. The sensors can collect data at a rate at least about 0.1 Hz, 0.2 Hz, 0.3 Hz, 0.4 Hz, 0.5 Hz, 1 Hz, 5 Hz, 10 Hz, 100 Hz, 1000 Hz, 10,000 Hz, 100,000 Hz, or more. The sensors in the processing pipeline 100 can transmit time series data, referred to as "tags" in this disclosure, to one or more computing devices that implement anomaly prediction and detection. Although the processing pipeline 100 is depicted as having only six sensors, it can have as many as tens of thousands of sensors.

The system of FIG. 1 may have a training subsystem 120. The training subsystem 120 may be configured to train machine learning models to predict and detect anomalies.

The training subsystem 120 may have a cluster module 122. The cluster module 122 may be configured to train and execute a clustering algorithm to determine groups of tags from the sensors 113-115 and 117-119 that are indicative of the operational performance of the subsystems in processing pipeline 100. Each group of tags can be correlated with the operational performance of a particular subsystem.

The clustering algorithm may be a hierarchical clustering algorithm. A hierarchical clustering algorithm is a clustering algorithm that clusters objects based on their proximity to other objects. For example, a hierarchical clustering algorithm can cluster tags from the processing pipeline 100 based on the physical proximity of their sensors to other sensors and to the relevant subsystem. The clustering algorithm may alternatively be a centroid-based clustering algorithm, e.g., a k-means clustering algorithm. A k-means clustering algorithm can partition n observations into k clusters, where each observation belongs to the cluster with the nearest mean. The mean may serve as a prototype for the cluster. In the context of tags from the processing pipeline 100, a k-means clustering algorithm can generate distinct groups of tags that are correlated with each other. Thereafter, each group of tags can be associated with a particular subsystem based on prior knowledge about that subsystem, e.g., knowledge about the sensors in the subsystem. The clustering algorithm can alternatively be a distribution-based clustering algorithm, e.g., a Gaussian mixture model or expectation maximization algorithm. Examples of other clustering algorithms that the clustering module 122 may implement are cosine similarity algorithms, topological data analysis algorithms, and hierarchical density-based clustering of applications with noise (HDB-SCAN).

The training subsystem 120 can additionally have an autoencoder training module 124. The autoencoder training module 124 can be used to train an autoencoder 132. The autoencoder training module 124 can train the autoencoder 132 on historical values of tags that are indicative of the operational performance of a selected subsystem. The historical tags can be tags collected during normal operation of the subsystem, e.g., in time periods during which no failures occurred in the subsystem. Training the autoencoder 132 on normal tags can result in the autoencoder 132 having parameters that represent "normal" features. Although FIG. 1 depicts only a single autoencoder, each subsystem in the system may have its own autoencoder, which can be trained on historical values of tags that are indicative of the operational performance of that particular subsystem.

The autoencoder 132 can have an encoder 133 that encodes measured values of a first plurality of tags that were determined to be indicative of the operational performance of a particular subsystem in the processing pipeline 100. The autoencoder 132 can also have a decoder 134 that attempts to reconstruct the measured values. Given measured values that are representative of the training data, the autoencoder 132 can generate estimated values that are similar or equivalent to the measured values. However, given anomalous measured values, the autoencoder 132 may produce a poor reconstruction.

The autoencoder 132 can be a neural network. In general, neural networks may employ multiple layers of operations to predict one or more outputs from one or more inputs. Neural networks may include one or more hidden layers situated between an input layer and an output layer. The output of each layer may be used as input to another layer, e.g., the next hidden layer or the output layer. Each layer of a neural network may specify one or more transformation operations to be performed on input to the layer. Such transformation operations may be referred to as neurons. The output of a particular neuron may be a weighted sum of the inputs to the neuron, adjusted with a bias and multiplied by an activation function, e.g., a rectified linear unit (ReLU) or a sigmoid function. Training a neural network may involve providing inputs to the untrained neural network to generate predicted outputs, comparing the predicted outputs to expected outputs, and updating the algorithm's weights and biases to account for the difference between the predicted outputs and the expected outputs. Specifically, a cost function may be used to calculate a difference between the predicted outputs and the expected outputs. By computing the derivative of the cost function with respect to the weights and biases of the network, the weights and biases can be iteratively adjusted over multiple cycles to minimize the cost function. Training can be complete when the predicted outputs satisfy a convergence condition, such as obtaining a small magnitude of calculated cost.

Neural networks can be trained using supervised or unsupervised learning processes. In supervised learning, the training inputs to the neural network are labeled. That is, the training inputs have known outputs. In contrast, in unsupervised learning, the training inputs are unlabeled. The autoencoder training module 124 can implement an unsupervised learning process to train the autoencoder 132; the inputs to the autoencoder 132 need not be labeled because the desired output of the autoencoder 132 is merely the input.

The autoencoder 132 can be a feedforward neural network, i.e., a neural network with only forward connections between neurons. Alternatively, the autoencoder 132 can be a recurrent neural network ("RNN"). RNNs can have cyclical connections that can encode dependencies in time-series data. An RNN can include an input layer that is configured to receive a sequence of time-series inputs, e.g., a time-series tag from a sensor in the processing pipeline 100. An RNN can also include one or more hidden recurrent layers that maintain a state. At each time step, each hidden recurrent layer can compute an output and a next state for the layer. The next state can depend on the previous state and the current input. The state can be maintained across time steps and can capture dependencies in the input sequence. Such an RNN can be used to encode times-series features of the processing pipeline 100.

One example of an RNN is a long short-term memory network (LSTM), which can be made of LSTM units. An LSTM unit can be made of a cell, an input gate, an output gate and a forget gate. The cell can be responsible for keeping track of the dependencies between the elements in the input sequence. The input gate may control the extent to which a new value flows into the cell, the forget gate can control the extent to which a value remains in the cell, and the output gate can control the extent to which the value in the cell is used to compute the output activation of the LSTM unit. The activation function of the LSTM gate can be the logistic function.

An inference subsystem 130 can implement the autoencoder 132 after it is trained. If the difference between measured values of a first plurality of tags provided to the autoencoder 132 and estimated values of the first plurality of tags generated by the autoencoder 132 exceeds a threshold, there may be an anomaly in the subsystem associated with the first plurality of tags. In such cases, the system can transmit an alert to an application 140, which will be described in more detail below.

The inference subsystem 130 can implement other types of machine learning models. For example, the inference subsystem 130 can implement machine learning models that are configured to (i) optimize the threshold at which anomalies are predicted or detected, (ii) predict failure modes associated with anomalies, or (iii) determine corrective actions. The machine learning models can be trained using supervised, semi-supervised, unsupervised, or reinforcement learning process. Examples of such machine learning models are regression algorithms, decision trees, support vector machines, Bayesian networks, neural networks (e.g., feedforward neural networks, CNNs, RNNs, and the like), clustering algorithms, reinforcement learning algorithms, and the like.

As mentioned above, the system of FIG. 1 may additionally include an application 140. The application 140 may be a mobile application or a web application. The application 140 can be used on any type of computing device, e.g., a desktop or laptop computer, an electronic tablet, a mobile device, or the like. Users, e.g., engineers and operations managers, can use the application 140 to review alerts and predicted failure modes generated by the inference subsystem 130, generate cases to track investigations of the anomalies, and create work orders to address any malfunctions underlying the alerts. The application 140 will be described in greater detail in reference to subsequent figures.

The system of FIG. 1 and its components can be implemented on one or more computing devices. The computing devices can be servers, desktop or laptop computers, electronic tablets, mobile devices, or the like. The computing devices can be located in one or more locations. The computing devices can have general-purpose processors, graphics processing units (GPU), application-specific integrated circuits (ASIC), field-programmable gate-arrays (FPGA), or the like. The computing devices can additionally have memory, e.g., dynamic or static random-access memory, read-only memory, flash memory, hard drives, or the like. The memory can be configured to store instructions that, upon execution, cause the computing devices to implement the functionality of the training subsystem 120, the inference subsystem 130, or the application 140. The computing devices can additionally have network communication devices. The network communication devices can enable the computing devices to communicate with each other and with any number of user devices, e.g., user devices running the application 140, over a network. For example, the inference engine 130 can transmit alerts, predicted failure modes, and the like to the user devices running the application 140. The network can be a wired or wireless network. For example, the network can be a fiber optic network, Ethernet® network, a satellite network, a cellular network, a Wi-Fi® network, a Bluetooth® network, or the like. In other implementations, the computing devices can be several distributed computing devices that are accessible through the Internet. Such computing devices may be considered cloud computing devices.

Figure 2:
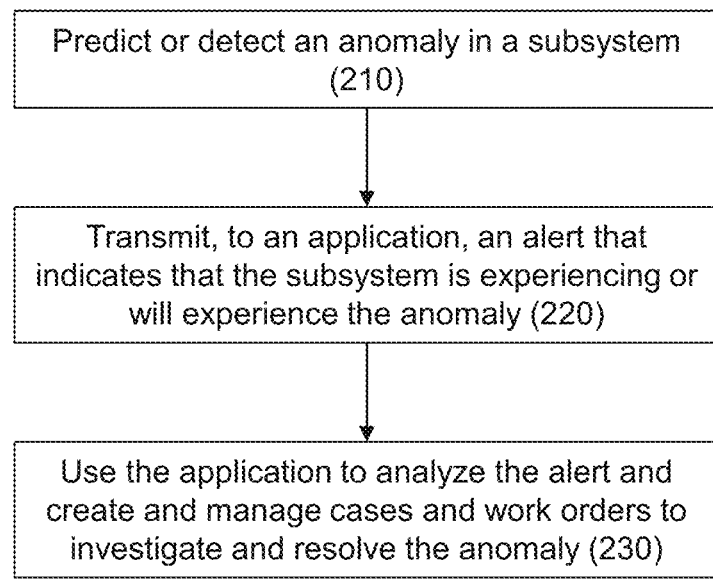
FIG. 2 is a flow chart of an example process for predicting a subsystem anomaly, generating an alert for the anomaly, generating a case to track an investigation of the anomaly, and placing a work order to resolve any failures identified during the investigation.

FIG. 2 is a flow chart of an example process for predicting a subsystem anomaly, generating an alert for the anomaly, generating a case to track an investigation of the anomaly, and placing a work order to resolve any failures identified during the investigation. The process can be performed by a system of one or more computers in one or more locations and one or more users who use an application, e.g., the application 140 of FIG. 1.

First, the system can predict or detect an anomaly in a subsystem (210). The prediction may be qualitative prediction, a quantitative prediction, or both. The qualitative prediction may be a prediction that an anomaly will occur within a specified period of time. The quantitative prediction may be a numerical risk score that indicates a likelihood that an anomaly will occur within the specified period of time. The prediction may additionally include one or more predicted failure modes associated with the anomaly. Operation 210 will be described in greater detail in reference to FIG. 3.

Next, the system can transmit, to an application on any number of user devices, an alert that indicates that the subsystem is experiencing or will experience the anomaly (220). The alert can identify the impacted system and subsystem and include the qualitative or quantitative prediction, the predicted failure modes, and the tags that contributed to the predicted or detected anomaly. The alert can serve as the basis for further investigation by users who use the application.

Finally, using the application, users can analyze the alert and create and manage cases and work orders to investigate and resolve the anomaly (230).

In one example, a user can assign the alert to an authorized reviewer. The reviewer may be an engineer or operations manager. The reviewer can provide feedback on the predicted failure modes. The feedback can be text comments. Alternatively or additionally, the reviewer can reject or accept the predicted failure modes or select one or more new failure modes from a drop-down menu. If the user does not provide feedback on the predicted failure modes, the application may assume that the predicted failure modes are correct. When the reviewer provides feedback, the system can automatically create a case that thereafter tracks all actions taken on the alert.

Cases can be distinct from alerts. The purpose of cases can be to track activity, coordinate across users, and enable collaboration. Cases can have a one-to-one or one-to-many relationship with alerts. That is, multiple, related alerts can in some cases be addressed with one case. Cases can enable collaboration through tagging other users and through comments and uploaded files that are available for editing or viewing by all users associated with the case. The application can enable users to take the following actions on a case: (1) assign the case and underlying alert to a reviewer, (2) add a comment to the case, (3) tag another user, (4) provide feedback on predicted failure modes, (5) create an associated work order, (5) close or re-open a case.

After providing feedback on the predicted failure modes, the reviewer can investigate the alert using alert analysis tools in the application, which will be described in greater detail in reference to subsequent figures. Briefly, the reviewer can examiner particular tags to identify the root cause of the alert, e.g., the defective component. The examiner can record comments about his findings, which can become part of the case history. Based on the results of his investigation, the reviewer can create a work order. When the work order is complete, the application can automatically close the alert and the case.

The data collected during operation 230 can be used to train a machine learning algorithm to predict appropriate corrective actions for detected anomalies. For example, a particular predicted anomaly, the tags giving rise to the predicted anomaly, and the corresponding failure mode selected by a user may serve as labeled data for training a supervised machine learning algorithm. As more training data is collected and incorporated into the algorithm over time, the algorithm's performance may improve.

Figure 3:
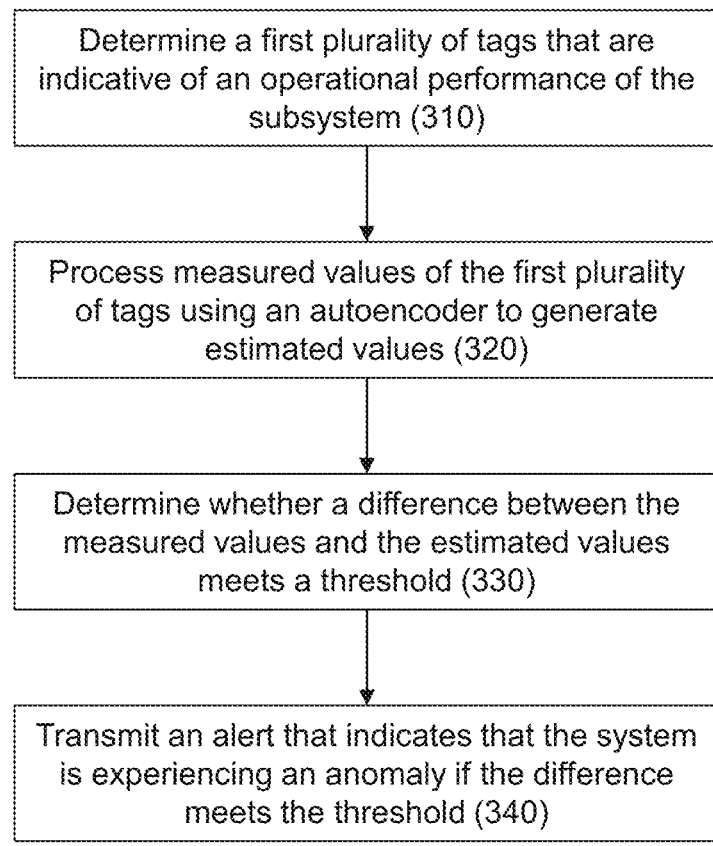
FIG. 3 is a flow chart of an example process for predicting an anomaly in a subsystem of system.

FIG. 3 is a flow chart of an example process for predicting an anomaly in a subsystem of system. The process of FIG. 3 can be performed by a system of one or more computers in one or more locations. For example, the training subsystem 120 and the inference subsystem 130 of FIG. 1 can perform the process of FIG. 3.

In a first operation, the system can determine a first plurality of tags that are indicative of an operational performance of the subsystem (310). The tags in first plurality of tags can be time series data from (i) sensors in the subsystem and (ii) sensors in the system that are not in the subsystem but are nonetheless indicative of the operational performance of the subsystem. For example, the tags can be from another subsystem that provides input to the subsystem, receives output from the subsystem, or is otherwise correlated with the subsystem.

The system can determine the tags that are indicative of the operational performance of the subsystem using one or more machine learning algorithms. For example, the system can process all tags in the system using a clustering algorithm, e.g., a k-means clustering algorithm, to generate distinct groups of tags, including the first plurality of tags. The tags in each distinct group may be correlated with each other or with the operational performance of a select subsystem. Operation 310 can be considered a feature selection operation. Operation 310 can be performed offline, i.e., prior implementing the system in a processing pipeline.

In a second operation, the system can process measured values of the first plurality of tags (i.e., the tags determined to be indicative of the operational performance of the subsystem) using an autoencoder (320). The measured values can be limited to a predetermined lookback horizon. The predetermined lookback horizon can be at least about 1 second, 2 seconds, 3 seconds, 4 seconds, 5 seconds, 10 seconds, 30 seconds, 1 minute, 5 minutes, 10 minutes, 30 minutes, 1 hour, 5 hours, 10 hours, 15 hours, 20 hours, 1 day, 5 days, 10 days, or more. The system can dynamically adjust the lookback horizon to optimize anomaly prediction accuracy. If the lookback horizon is too long, the measured value may contain extraneous data. If the lookback horizon is too short, the measured value may lack important contextual information. The system can use any of the machine learning methods described in this disclosure to optimize the lookback horizon.

The autoencoder can have an encoder that is configured to generate a reduced-dimension or compressed output of the measured values of the first plurality of tags. The autoencoder can additionally have a decoder that is configured to generate estimated values of the first plurality of tags from the reduced-dimension or compressed output. The autoencoder can be a deep neural network, e.g., a feedforward neural network, a convolutional neural network, a recurrent neural network, or the like. The autoencoder can be trained on historical values of the first plurality of tags. In some cases, the historical values can be collected during normal operation of the subsystem, e.g., in periods of time during which the subsystem did not experience an anomaly. Training the autoencoder on normal, historical values can result in the autoencoder having parameters that represent "normal" features. Provided measured values that are representative of the historical values used for training, the autoencoder can generate estimated values that are similar or equivalent to the measured values. However, provided anomalous measured values, the autoencoder may produce a poor estimation.

In a third operation, the system can determine whether a difference between the measured values of the first plurality of tags and the estimated values of the first plurality of tags meets a threshold (330). If the system determines that the difference does not meet the threshold, that can indicate that the subsystem's operational performance is normal, e.g., that the subsystem is not experiencing an anomaly, that the subsystem is operating within normal parameters, or that the subsystem is producing a quality product. If, on the other hand, the system determines that the difference does meet the threshold, that can indicate that the subsystem is experiencing an anomaly.

In some cases, the system can apply weights to the measured and estimated values of the tags prior to determining whether the difference meets the threshold. The system may do so because some tags may be more highly correlated with the operational performance of the subsystem than others. The system can apply larger weights to such tags than to tags that are less highly correlated with the subsystem's operational performance.

The system can dynamically adjust the threshold during operation of the system as new data becomes available and new anomalies occur. For example, the system can make the threshold lower if the system predicts or detects one or more anomalies that are classified as false positives by a user. On the other hand, the system can make the threshold higher if the system fails to predict or detect an anomaly. The system can use any of the machine learning methods described herein to optimize the threshold.

In a fourth operation, the system can transmit an alert that indicates that the system is experiencing an anomaly if the difference meets the threshold (340). The alert can additionally include a numerical risk score. The numerical risk score can indicate the severity of the predicted anomaly. The numerical risk score can be based at least in part on (i) the magnitude of difference between the measured values of first plurality of tags and the estimated values of the first plurality of tags, or (ii) how much the difference exceeds the threshold. The alert can additionally include a list of the tags that contributed to the alert, how much each tag contributed, and values of the tags over the lookback window. The alert can additionally include predicted failure modes associated with the alert. The system can predict such failure modes using, for example, a machine learning classifier, or any of the other machine learning methods described herein.

The alert can be an email or a text message. Alternatively or additionally, the alert can be a notification in a mobile or web application, e.g., the application 140 of FIG. 1. The alert can specify a quantitative risk score associated with the alert, a risk threshold, the system and subsystem associated with alert, and the date and time the alert was generated. As will be described in more detail in subsequent figures, the application can be configured to enable a user to perform an investigation into the alert.

In some cases, in addition to determining whether the difference between the measured values of the first plurality of tags and the estimated values of the first plurality of tags, in aggregate, meet the threshold, the system can determine whether differences between individual measured values and estimated values meet individual thresholds for the corresponding tags and, if so, transmit an alert indicating so. This can alert users to irregular data points that may not yet give rise to an anomaly.

User Interface

FIG. 4 through FIG. 18 show user interfaces of an application that can enable users to investigate alerts and generate and manage cases and word orders associated with such alerts.

Figure 4:
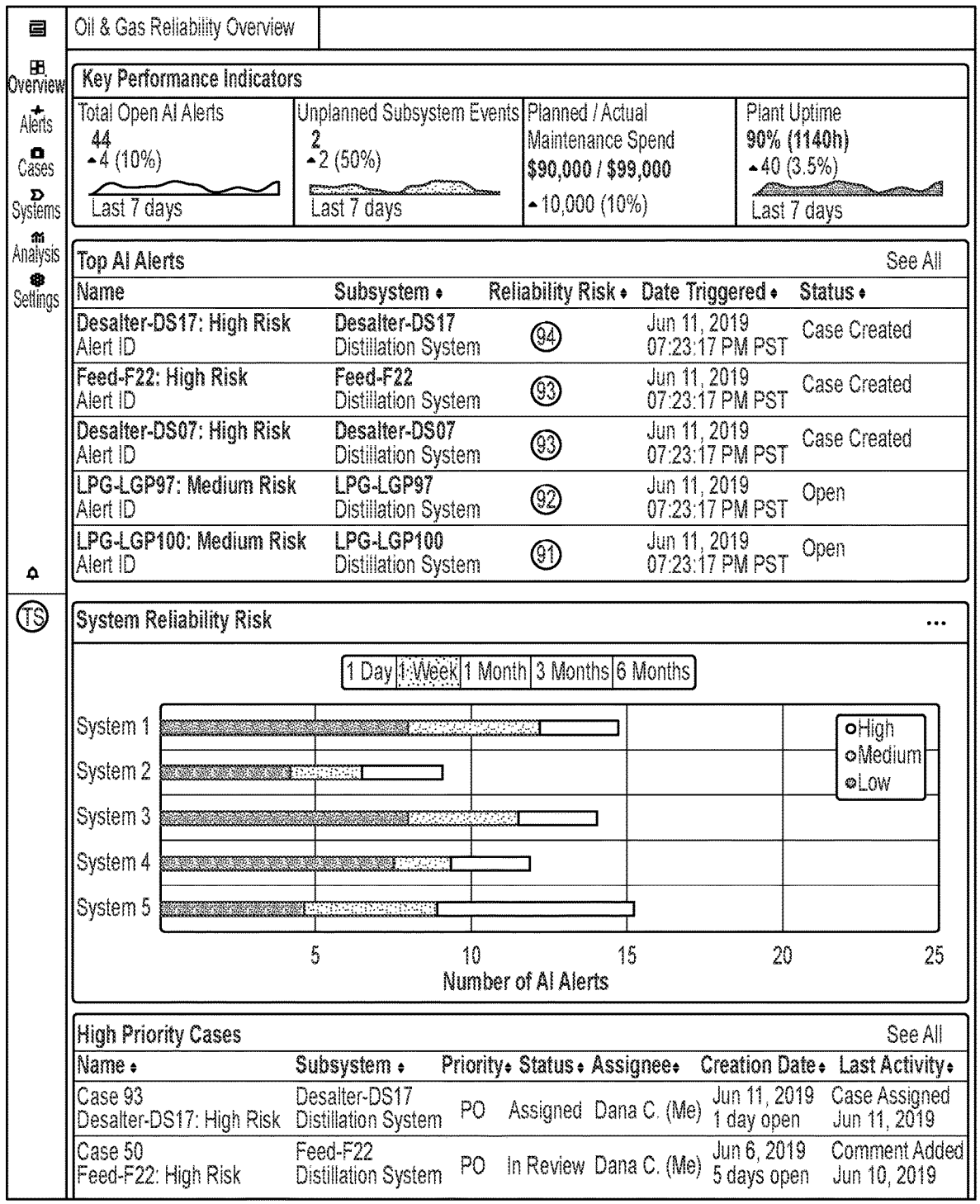

FIG. 4 shows a home screen of the application. The home screen can display key performance indicators ("KPIs") related to the processing pipeline being monitored. The KPIs can include the total number of open (e.g., unresolved) alerts, unplanned subsystem events, maintenance spending relative to a maintenance budget, and plant uptime, all over a selected time period. The home screen can display the total number of open alerts, unplanned subsystem events, and plant uptime in graphs as a function of time.

The home screen can additionally display a grid that shows the highest priority alerts in the processing pipeline. Each row in the grid can correspond to a different alert. The inference subsystem 130 of FIG. 1 can generate and transmit the alerts to the application by performing the process of FIG. 3. The columns in the grid can show each alert's name, subsystem of origin, a qualitative risk score (e.g., low, medium, or high), a numerical risk score, date and time of generation, and status (e.g., case created, open, etc.). The numerical risk scores can range from 0 to 100, for example, with 100 indicating the highest risk of an anomaly. The numerical risk scores can be color-coded to indicate the predicted severity of the corresponding anomaly. For example, the most severe anomalies can have red risk scores, while less severe anomalies can have yellow risk scores.

The home screen can additionally display a stacked bar chart that shows the systems in the processing pipeline that have caused the most alerts. The alerts in each bar can be color-coded to show the number of bars in each qualitative risk category (e.g., low, medium, or high). The stacked bar chart can be configured to show the systems in the processing pipeline that caused the most alerts in the last day, week, month, three months, six months, year, or more.

The home screen can additionally display a grid that shows the highest priority cases in the processing pipeline. Each row in the grid can correspond to a different case. The application or a user can generate the cases in response to alerts. The columns in the grid can show each case's name, subsystem of origin, priority, status (e.g., in review, assigned, etc.), assignee (e.g., person assigned to resolve the case), creation date, and date of last activity. The cases can be assigned a priority by a user. Alternatively, the application can automatically assign a priority to the case based on a number of factors. For example, the application can consider the underlying subsystem's importance to the processing pipeline, the severity of the anomaly, and the estimated expense and time to resolve the anomaly.

The grids described above can be alphabetically or numerically sorted by any column.

The home screen can additionally have a navigation bar that can allow users to navigate to an alerts screen, a cases screen, a systems screen, an analysis screen, and a settings screen.

Figure 5:
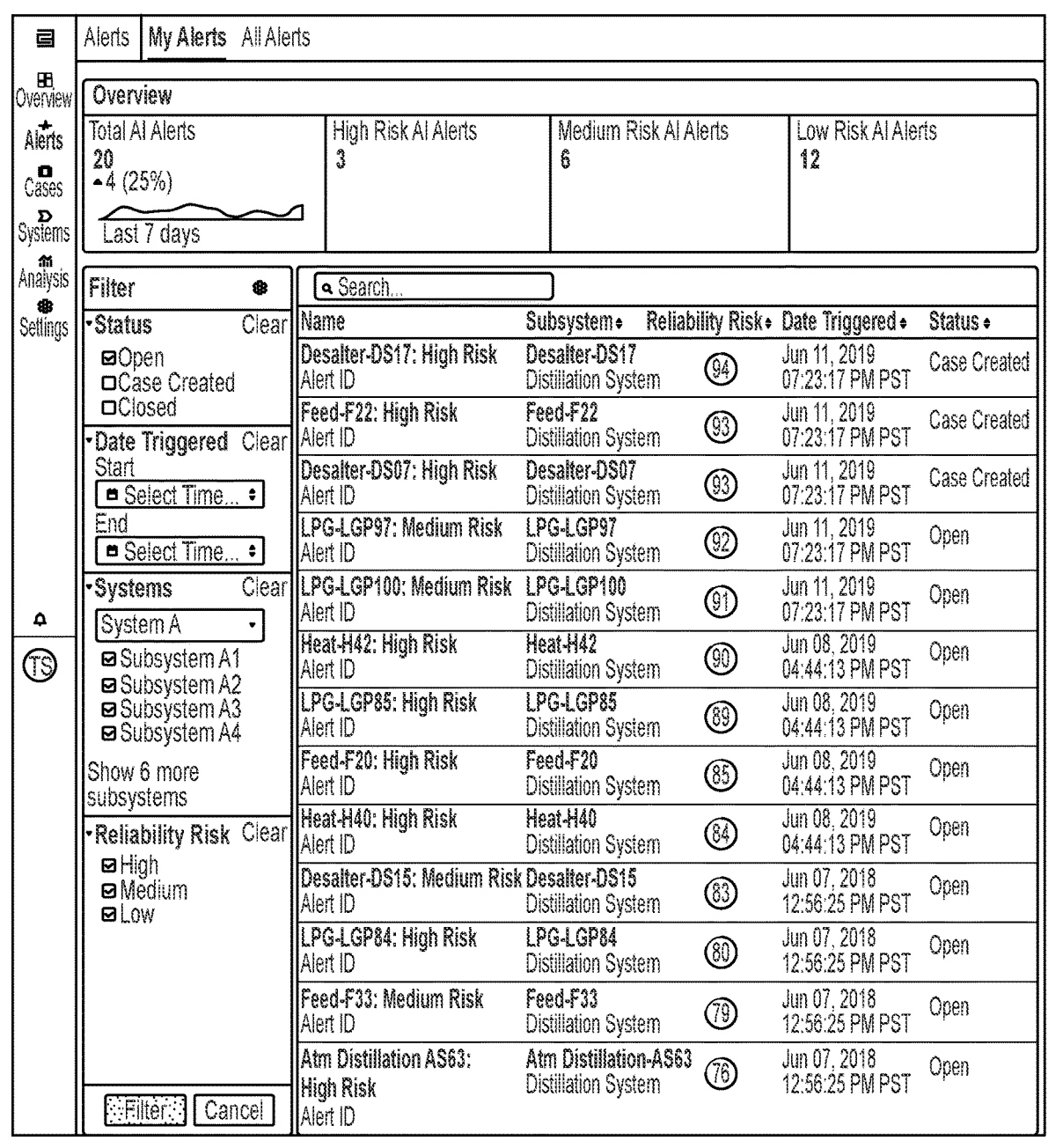

FIG. 5 shows an alerts screen. A user can open the alerts screen by selecting the alerts icon in the navigation bar. The alert screen can enable a user to search for and filter alerts in the processing pipeline. The user can view his own alerts (e.g., alerts assigned to the user, alerts on which the user has collaborated, or alerts in which the user is mentioned) or all alerts in the processing pipeline.

The alerts screen can have an overview window. The overview window can display the total number of alerts for the user or in the processing pipeline. The overview window can additionally display the number of high, medium, and low risk alert.

The alerts screen can have a search bar. The search bar can enable a user to search for alerts by keyword. The alerts screen can also have a filtering window. The filtering window can enable a user to filter the alerts returned as the result of a keyword search. The user can filter the alerts by status (e.g., open, case created, or closed), date triggered, system or subsystem of original, or the qualitative risk category of the alert.

The alerts screen can display a grid of alerts that meet the search and filtering criteria. Each row in the grid can correspond to a different alert. The columns in the grid can show each alert's name, subsystem of origin, a qualitative risk score (e.g., low, medium, or high), a numerical risk score, date and time of generation, and status (e.g., case created, open, etc.).

FIG. 6 shows an alert detail screen. The alert detail screen can display more detailed information about a particular alert. The alert detail screen can have an overview window that displays the name of the alert, its subsystem of original, its qualitative risk score, its current quantitative risk score and quantitative risk score over time, the date it was triggered, and its status (e.g., new). The overview window can additionally have a button that is configured to generate a case or workorder when selected by a user.

The alert detail screen can display a grid of tags that contribute to the alert. Each row in the grid can correspond to a different tag. The columns in the grid can show each tag's name (e.g., temperature, pressure, vibration, etc.), how much each tag contributes to the alert, and the value of each tag when the alert was generated. A user can expand each tag to reveal data quality alerts and threshold alerts associated with the tag. Data quality alerts can indicate that data from the sensor associated with the tag was lost or corrupted. Threshold alerts can indicate that data values from the sensor associated with the tag exceed a threshold.

The alert detail screen can additionally display the most common failure modes associated with the alert to aid the user in resolving the alert.

Figure 7:
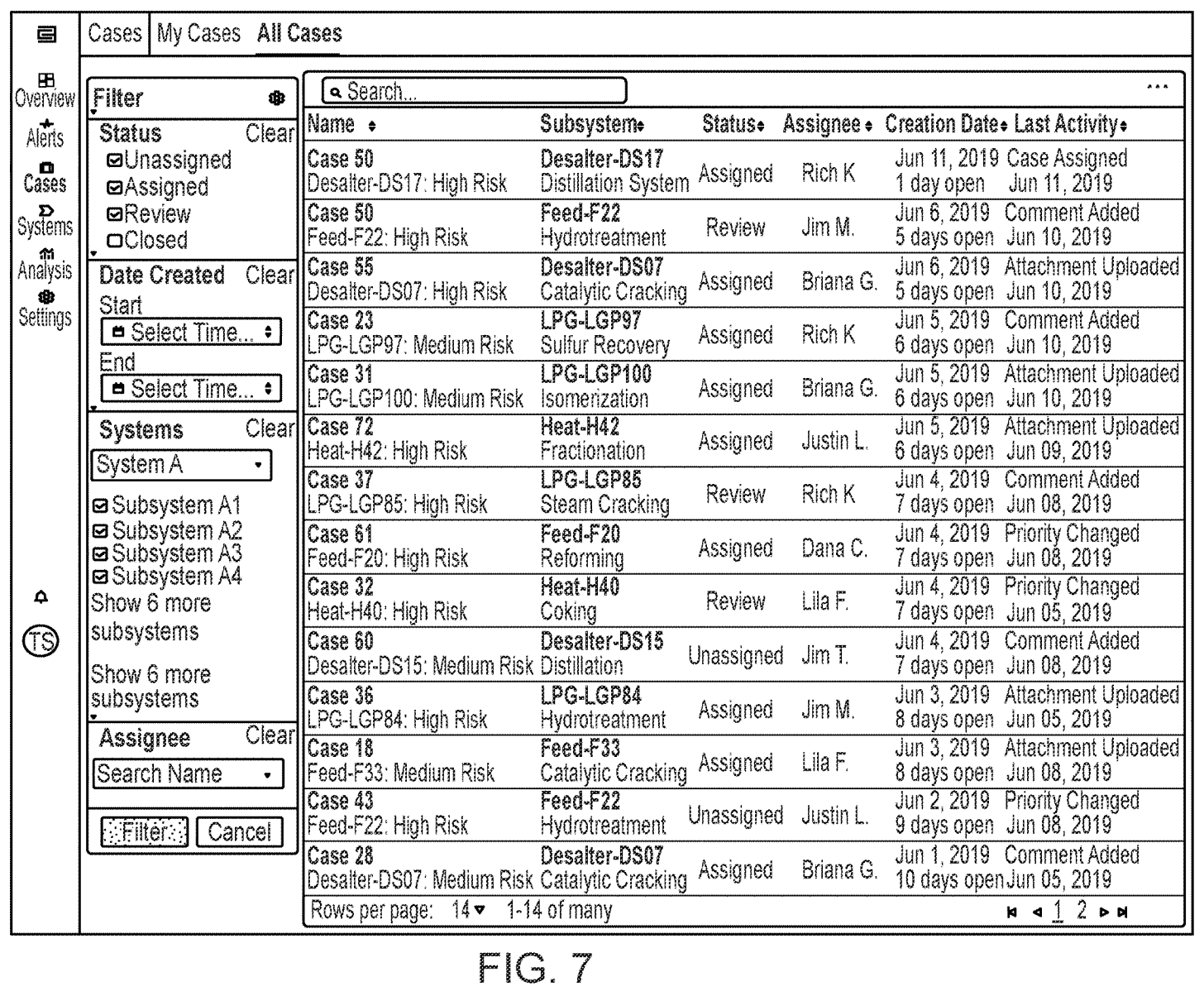

FIG. 7 shows a cases screen. The cases screen can enable a user to search for and filter cases in the processing pipeline. Cases may be distinct from alerts in that cases may support collaboration and traceability of investigations, while alerts may merely be a method of notification. Additionally, in some circumstances, there may not be a one-to-one correspondence between alerts and cases. For example, one case may be used to resolve many related alerts.

The cases screen can be similar in form to the alerts screen. The cases screen can enable a user to search for and filter cases in the processing pipeline. The user can view his own case (e.g., cases assigned to the user, cases on which the user has collaborated, or cases in which the user is mentioned) or all cases in the processing pipeline.

The case screen can have a search bar. The search bar can enable a user to search for case by keyword. The cases screen can also have a filtering window. The filtering window can enable a user to filter the cases returned as the result of a keyword search. The user can filter the cases by status (e.g., unassigned, assigned, review, closed), date created, system or subsystem of origin, or assignee.

The cases screen can display a grid of cases that meet the search and filtering criteria. Each row in the grid can correspond to a different case. The columns in the grid can show each case's name, subsystem of origin, status, assignee, and date and content of the last activity taken on the case (e.g., case assigned, comment added, attachment uploaded, priority changed, etc.).

Figure 8:
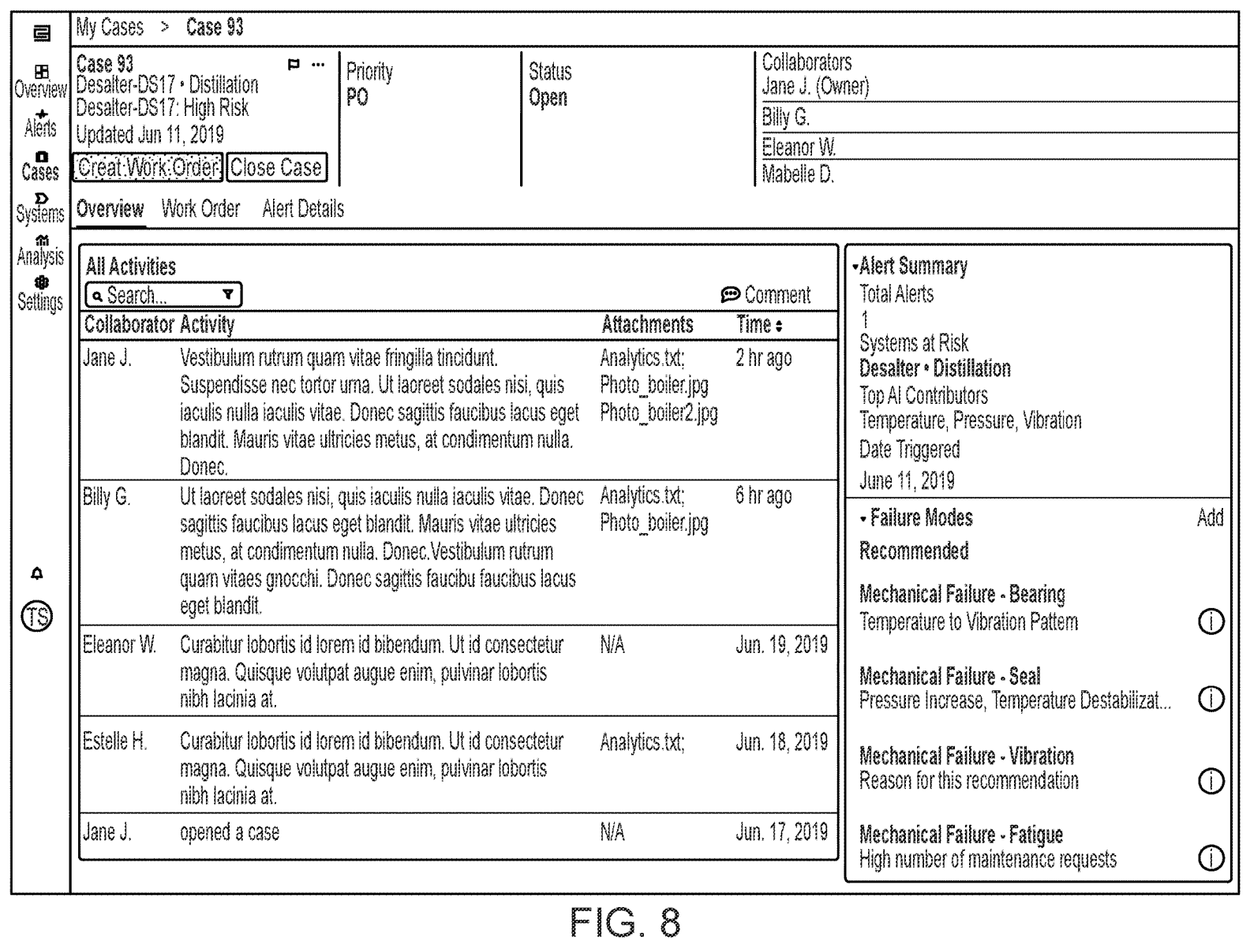

FIG. 8 shows a case detail screen. The case detail screen can provide a collaboration and investigation workspace for users to handle a particular case.

The case detail screen can display an overview window. The overview window can show the name of the case, the system and subsystem associated with the case, the date of last activity on the case, the case's priority (e.g., as manually defined by a user when the case is opened), the status of the case (e.g., alert open, case created, work order created, work order complete, case closed), and the collaborators on the case (e.g., the case owner and other users who have been mentioned or have commented on the case). The overview window can also have action buttons configured to enable a user to create a workorder for the case, close the cases, or edit the case's priority.

The case detail screen can additionally display a grid of actions associated with the case. Each row in the grid can correspond to a different action. Each row can show the collaborator who took the action, a summary of the action, a list of attachments (e.g., marked up schematics, photos of the subsystem associated with the case, etc.), and the time the action was taken.

The case detail screen can additionally display an alert summary window. The alert summary window can show the top three tags that contributed to the alert, systems or subsystems that may be at risk as a result of the alert, the date the alert was generated, a quantitative risk score of the alert, and a list of suggested failure modes commonly associated with alerts of the type. The list of suggested failure modes can be configured to enable a user to accept or reject the suggested failure modes, provide feedback on the suggested failure modes, or add a new failure mode from a dropdown list.

Figure 9:
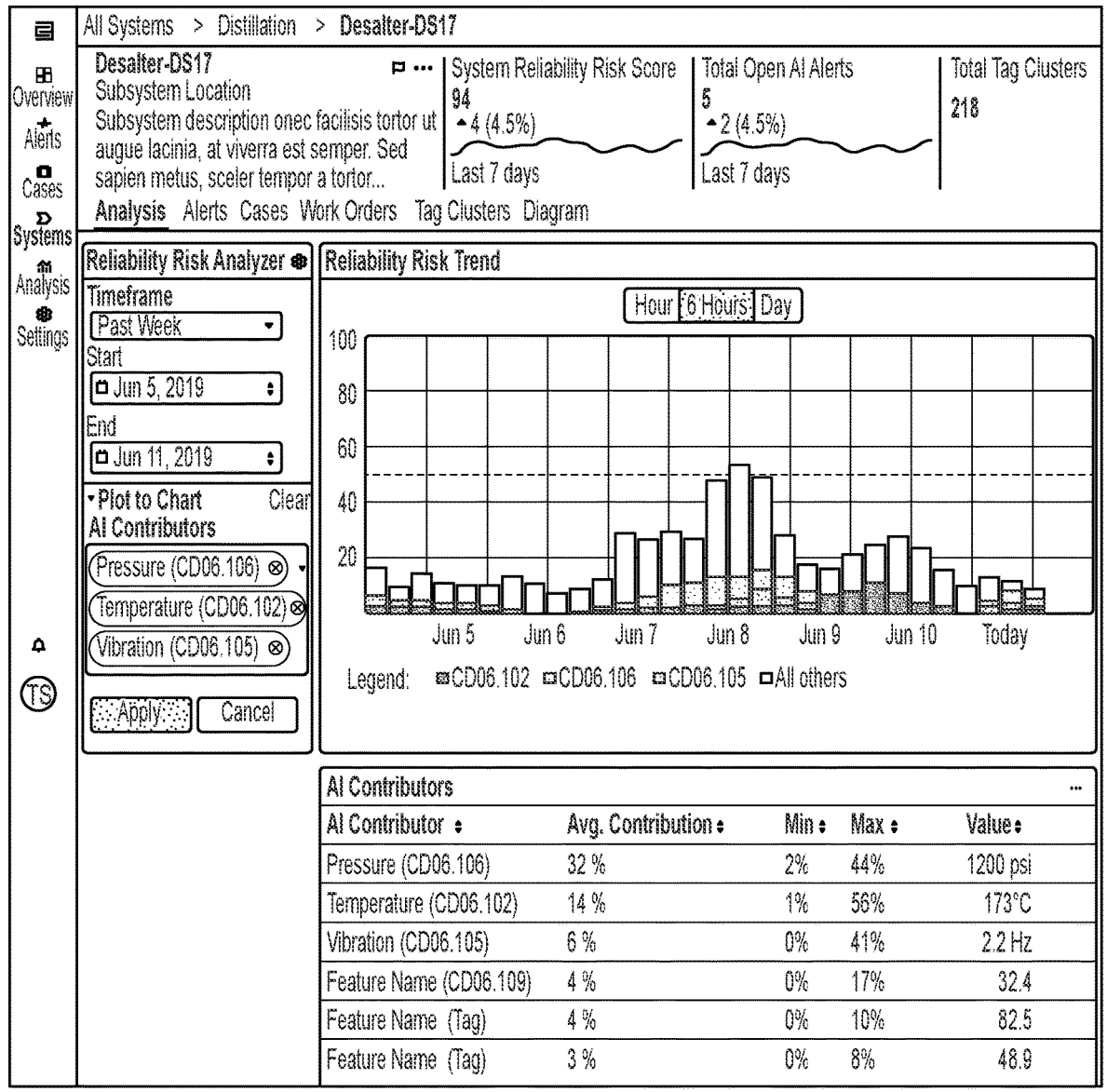

FIG. 9 shows a subsystem analysis tab of a subsystem detail screen. The subsystem detail screen can provide users functionality to focus on a single subsystem within a processing pipeline or facility. The subsystem detail screen can display a quantitative risk score of the subsystem over time, historical alerts, cases, and work orders associated with the system.

The subsystem analysis tab can display a grid of tags that contribute to a quantitative risk score for the subsystem. Each row in the grid can correspond to a different tag. The columns in the grid can show each tag's minimum, maximum, and average contribution to the quantitative risk score for over a selected time period, and the most recent measured value of the tag.

The subsystem analysis tab can additionally display a chart that shows the contribution of the top three tags to the quantitative risk score of the subsystem over time. A filtering window adjacent to the chart can enable a user to select the tags that are displayed in the chart. For example, the user can specify the tags to be displayed and the time period over which to display them.

FIG. 10 shows a cases tab of the subsystem detail screen. Although not depicted, the subsystem detail screen can additionally have alert and word order tabs. These tabs can allow users to search, filter, and display cases, alerts, and work orders of a particular subsystem. These tabs can be similar to previous screens, except that the cases, alerts, and word orders are limited to a particular subsystem.

Figure 11:
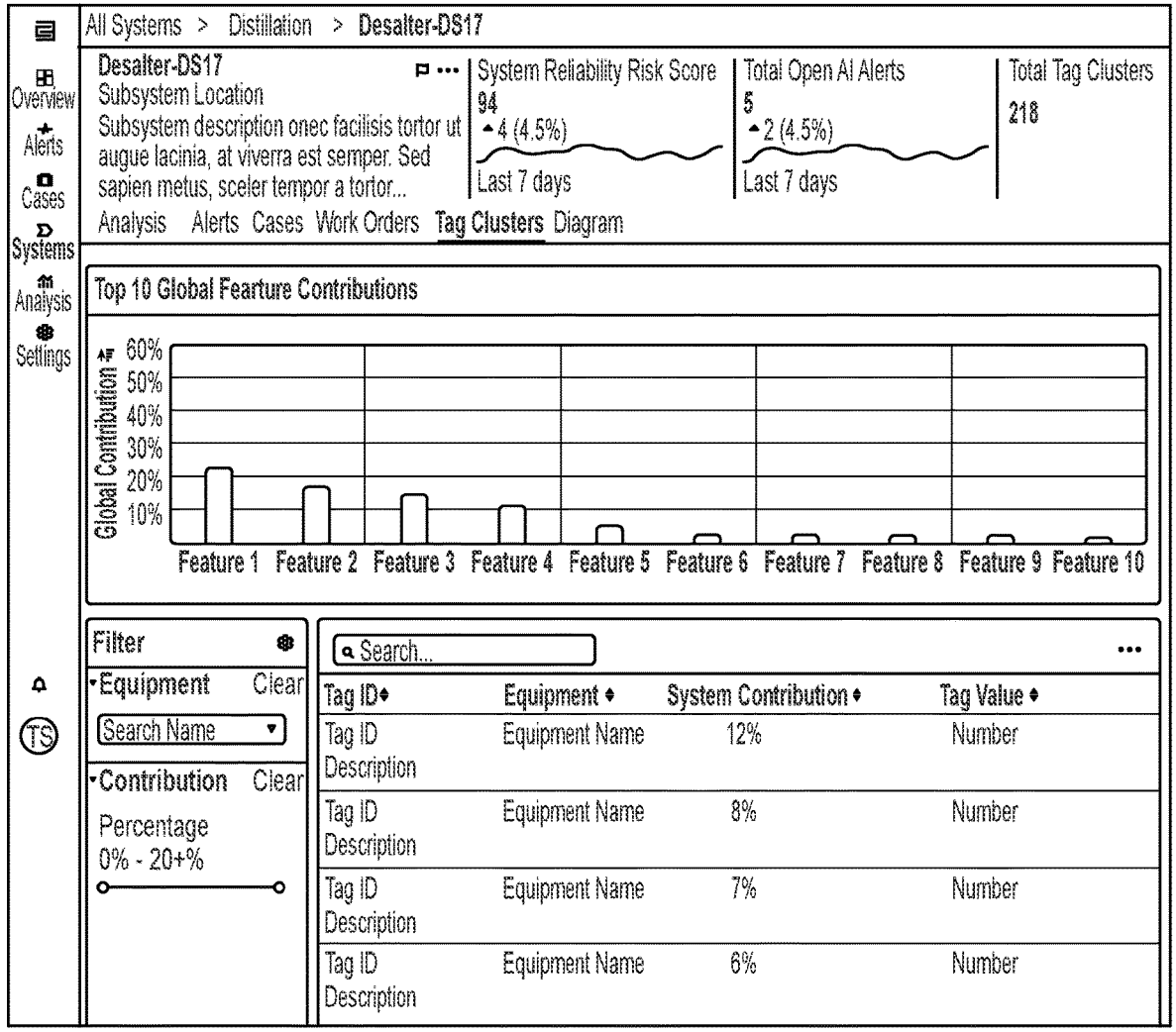

FIG. 11 shows a cluster tab of the subsystem detail screen. The cluster tab can display tags that have been identified by the system as relevant to the quantitative risk score of the subsystem, e.g., by performing the unsupervised clustering methods described in reference to FIG. 3.

Figure 12:
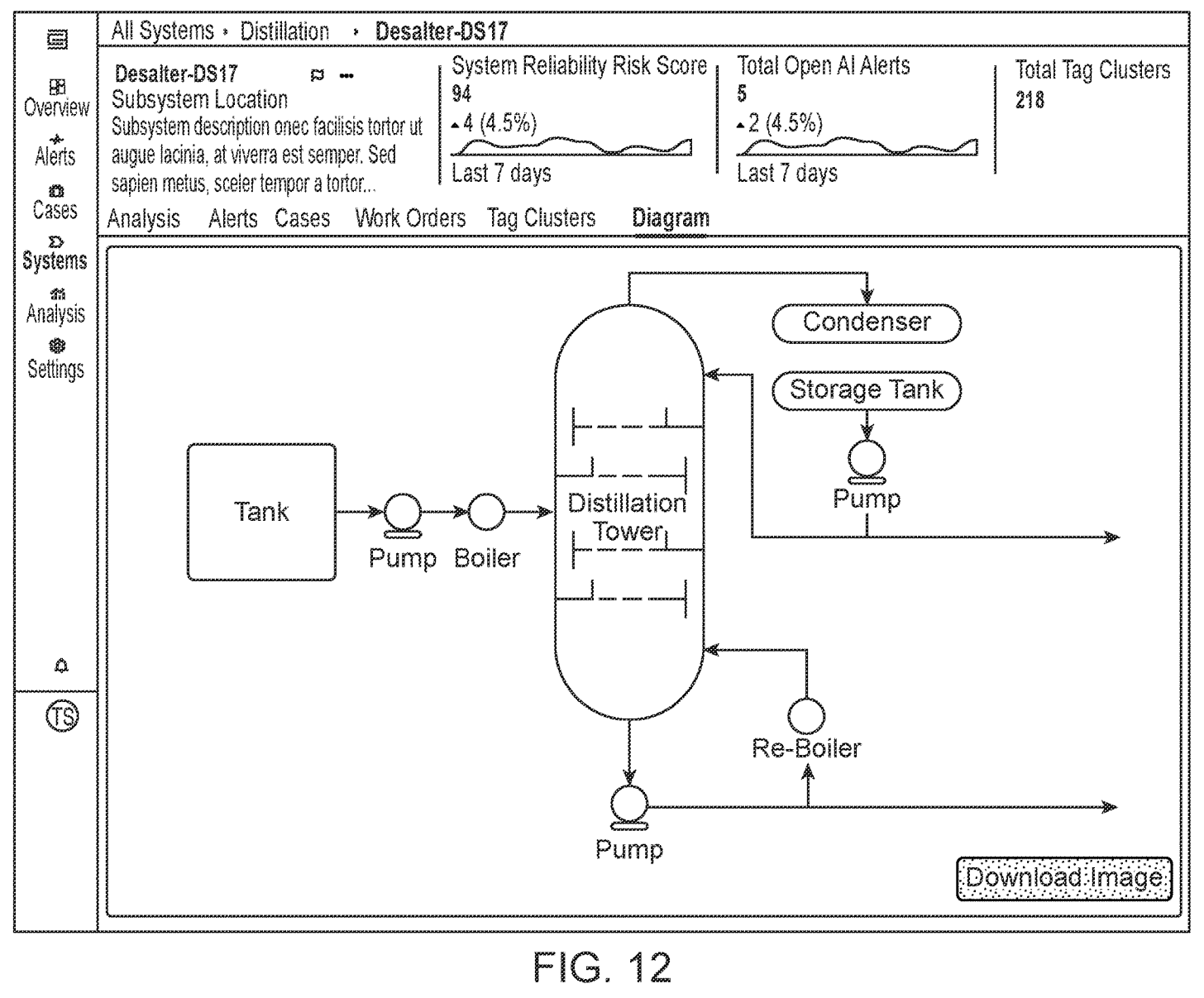

FIG. 12 shows a subsystem diagram tab of the subsystem detail screen. The subsystem diagram tab can show a diagram of the subsystem. The diagram can be static, e.g., an image, or it can be dynamic, e.g., an interactive model with traversable links.

FIG. 13 shows a systems screen of the application. The systems screen can provide users of the application with a consolidated view of all systems in a processing pipeline. The systems screen can include a grid that displays each system in a separate row. The columns in the grid can show the quantitative risk score of each system, the number of active alerts for each system, the number of open cases for each system, and the location of the system.

A summary window in the systems screen can additionally show the number of systems or subsystems that have alerts.

FIG. 14 show a subsystems tab of a systems detail screen. The subsystems tab can show more detailed information about the subsystems in the system, including each subsystem's (i) quantitative risk score, number of active alerts, number of open cases, and the last activity for the subsystem (e.g., alert created, case opened, alert closed, case closed, work order created, etc.).

FIG. 15 shows a subsystem alerts tab of the system detail screen. The subsystem alerts tab can show more detailed information about alerts in the various subsystems of the system.

Figure 16:
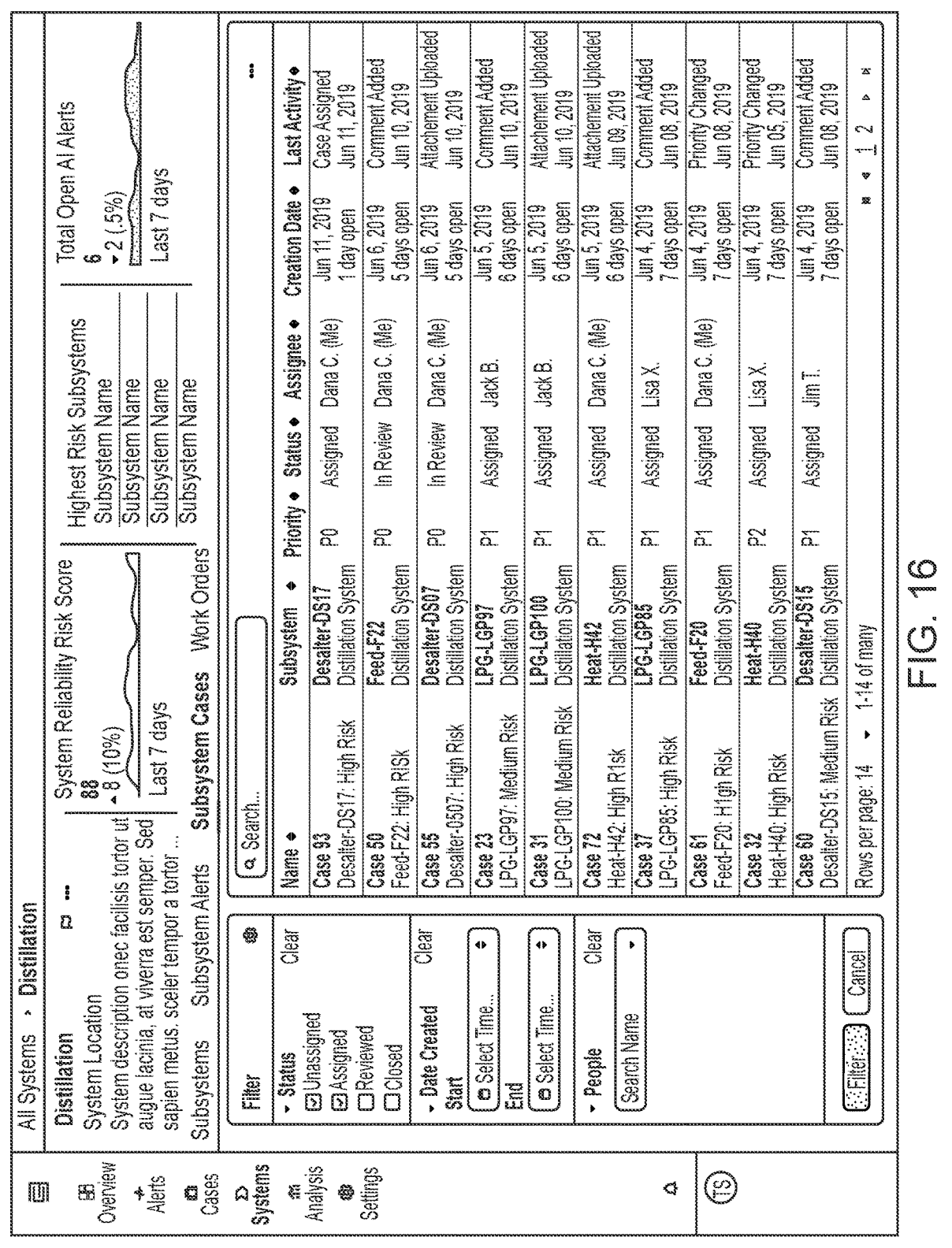

FIG. 16 shows a subsystem cases tab of the system detail screen. The subsystem cases tab can show more detailed information about cases associated with various subsystems of the system.

Figure 17:
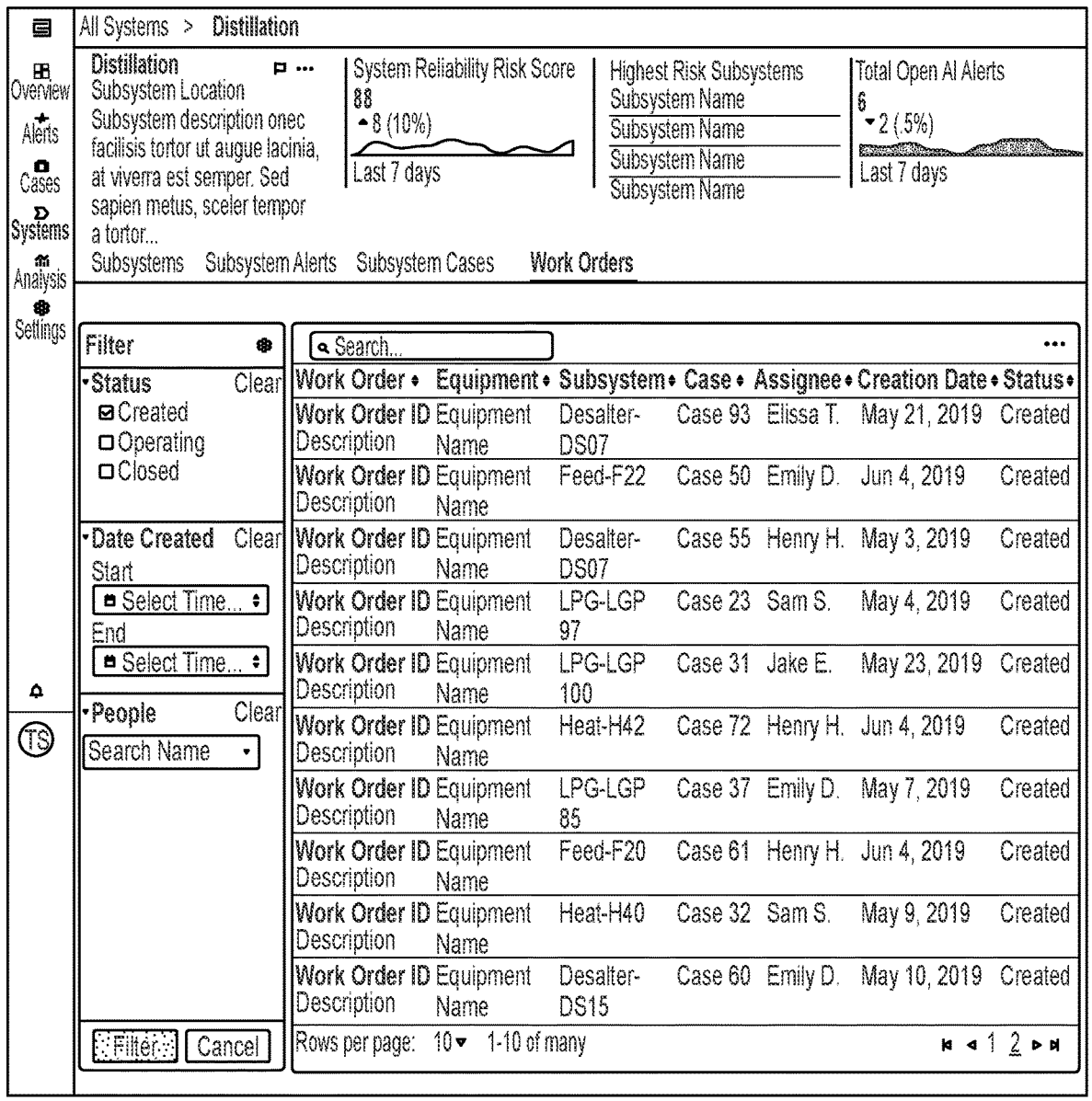

FIG. 17 shows a work orders tab of the system detail screen. The workorders tab can show more detailed information about work orders associated with various subsystems of the system.

Figure 18:
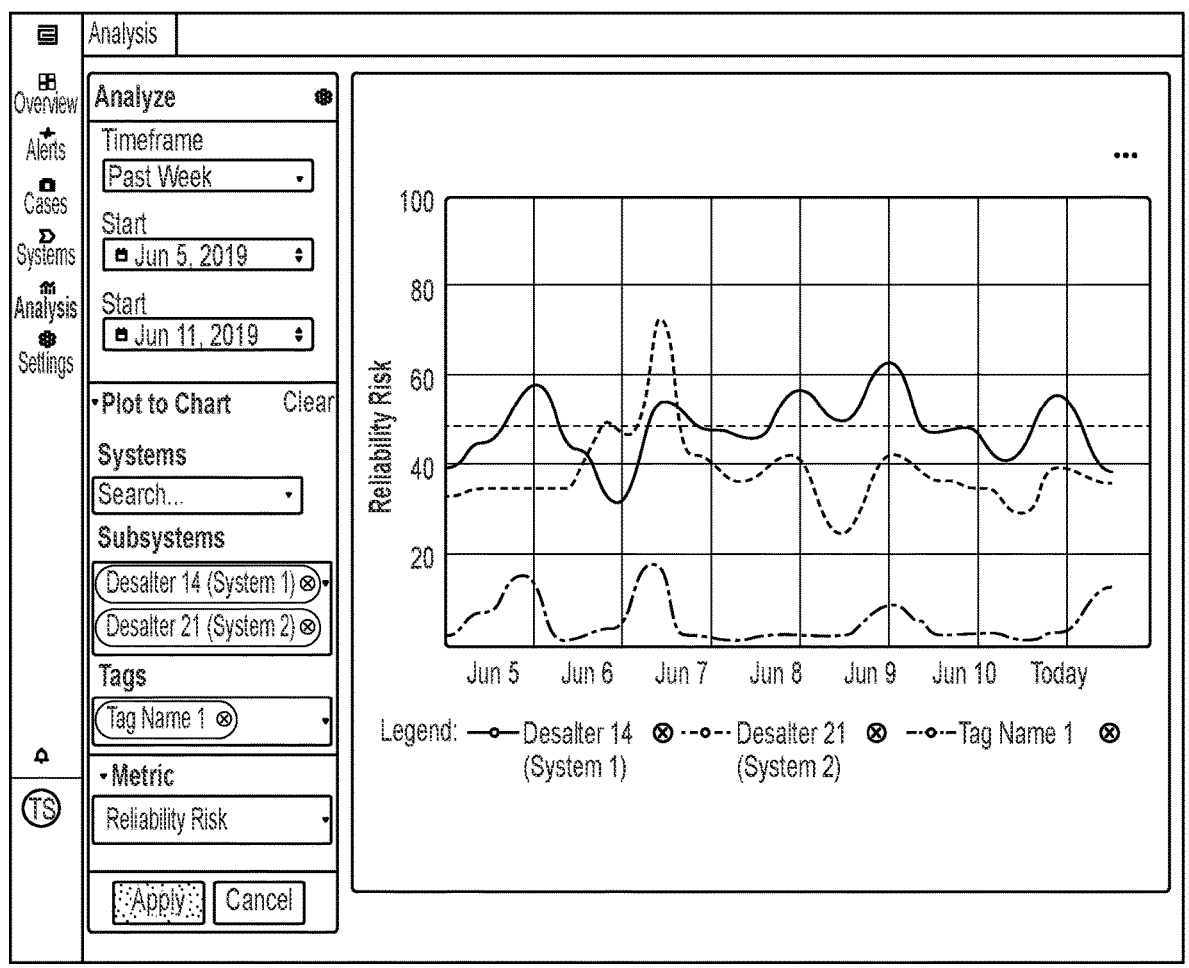

FIG. 18 shows a data analysis screen of the application. The data analysis screen can provide users functionality to plot any metric or times within the scope of the application instance, e.g., a tag, subsystem quantitative risk score, system quantitative risk score, or the like.

Figure 19:
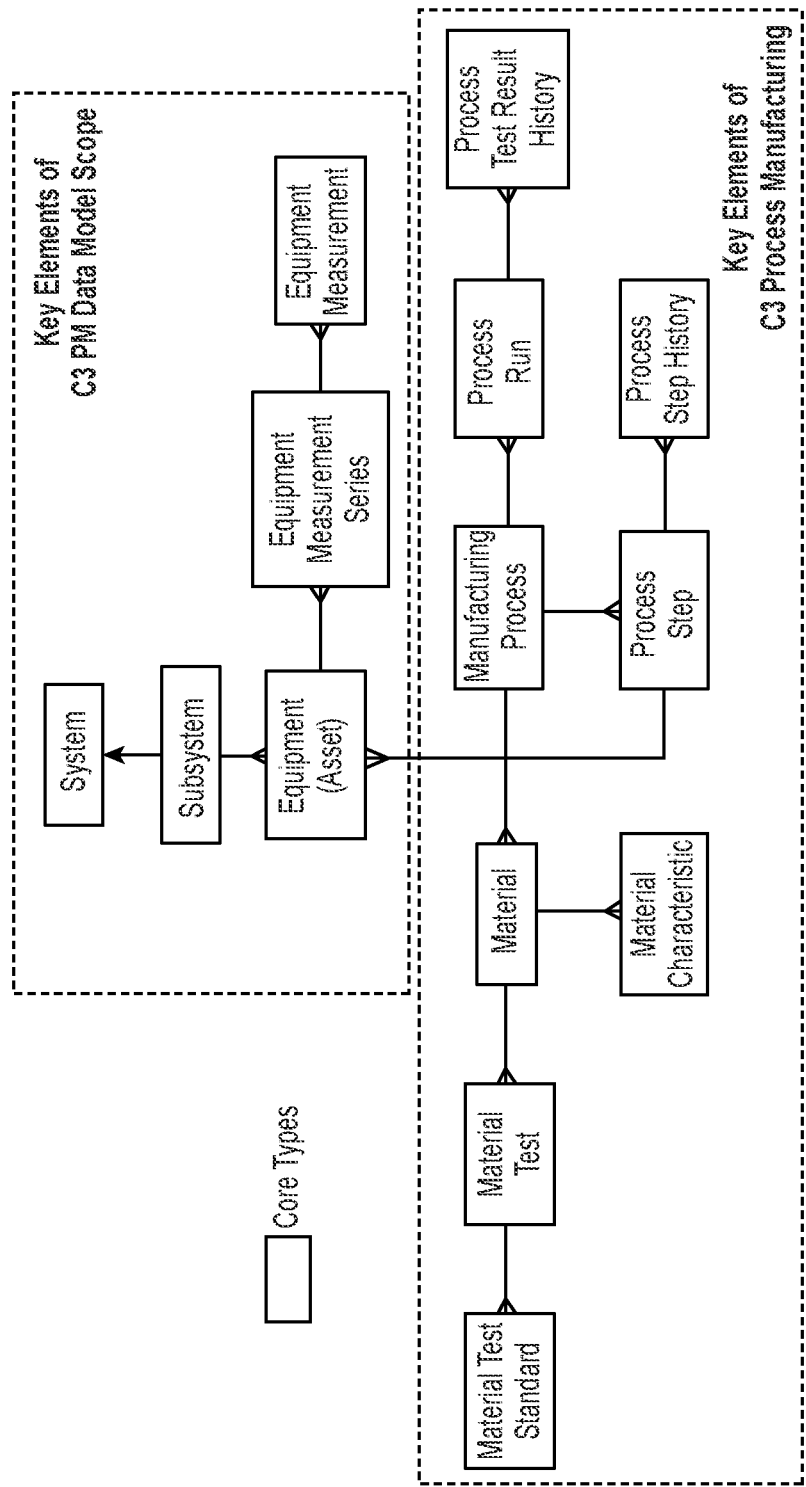
FIG. 19 schematically illustrates models that can be used to represent a processing pipeline in the application depicted in FIG. 4 through FIG. 18.

FIG. 19 schematically illustrates models that can be used to represent a processing pipeline in the application. The models can be abstract representations of various of materials, assets, processes, data, and the like. The models can be arranged in a hierarchical fashion. For example, multiple process step models can be arranged in series or in parallel to represent a manufacturing process. As another example, asset models can be combined together to represent a subsystem, and subsystem models can be combined together to represent a system. Material and data models can represent inputs and outputs, respectively, of process steps or manufacturing process models.

The models can be defined by fields and functions. The values of the fields and functions can specify the particular materials, assets, processes, and data that the models represent.

Computer Systems

The present disclosure provides computer systems that are programmed to implement methods of the disclosure. FIG. 20 shows a computer system 2001 that is programmed or otherwise configured to implement the system of FIG. 1. The computer system 2001 can be an electronic device of a user or a computer system that is remotely located with respect to the electronic device. The electronic device can be a mobile electronic device.

The computer system 2001 includes a central processing unit (CPU, also "processor" and "computer processor" herein) 2005, which can be a single core or multi core processor, or a plurality of processors for parallel processing. The computer system 2001 also includes memory or memory location 2010 (e.g., random-access memory, read-only memory, flash memory), electronic storage unit 2015 (e.g., hard disk), communication interface 2020 (e.g., network adapter) for communicating with one or more other systems, and peripheral devices 2025, such as cache, other memory, data storage and/or electronic display adapters. The memory 2010, storage unit 2015, interface 2020 and peripheral devices 2025 are in communication with the CPU 2005 through a communication bus (solid lines), such as a motherboard. The storage unit 2015 can be a data storage unit (or data repository) for storing data. The computer system 2001 can be operatively coupled to a computer network ("network") 2030 with the aid of the communication interface 2020. The network 2030 can be the Internet, an internet and/or extranet, or an intranet and/or extranet that is in communication with the Internet. The network 2030 in some cases is a telecommunication and/or data network. The network 2030 can include one or more computer servers, which can enable distributed computing, such as cloud computing. The network 2030, in some cases with the aid of the computer system 2001, can implement a peer-to-peer network, which may enable devices coupled to the computer system 2001 to behave as a client or a server.

The CPU 2005 can execute a sequence of machine-readable instructions, which can be embodied in a program or software. The instructions may be stored in a memory location, such as the memory 2010. The instructions can be directed to the CPU 2005, which can subsequently program or otherwise configure the CPU 2005 to implement methods of the present disclosure. Examples of operations performed by the CPU 2005 can include fetch, decode, execute, and writeback.

The CPU 2005 can be part of a circuit, such as an integrated circuit. One or more other components of the system 2001 can be included in the circuit. In some cases, the circuit is an application specific integrated circuit (ASIC).

The storage unit 2015 can store files, such as drivers, libraries and saved programs. The storage unit 2015 can store user data, e.g., user preferences and user programs. The computer system 2001 in some cases can include one or more additional data storage units that are external to the computer system 2001, such as located on a remote server that is in communication with the computer system 2001 through an intranet or the Internet.

The computer system 2001 can communicate with one or more remote computer systems through the network 2030. For instance, the computer system 2001 can communicate with a remote computer system of a user (e.g., a user device that runs the application 140 of FIG. 1). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 2001 via the network 2030.

Methods as described herein can be implemented by way of machine (e.g., computer processor) executable code stored on an electronic storage location of the computer system 2001, such as, for example, on the memory 2010 or electronic storage unit 2015. The machine executable or machine-readable code can be provided in the form of software. During use, the code can be executed by the processor 2005. In some cases, the code can be retrieved from the storage unit 2015 and stored on the memory 2010 for ready access by the processor 2005. In some situations, the electronic storage unit 2015 can be precluded, and machine-executable instructions are stored on memory 2010.

The code can be pre-compiled and configured for use with a machine having a processor adapted to execute the code, or it can be compiled during runtime. The code can be supplied in a programming language that can be selected to enable the code to execute in a pre-compiled or as-compiled fashion.

Aspects of the systems and methods provided herein, such as the computer system 2001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 2001 can include or be in communication with an electronic display 2035 that comprises a user interface (UI) 2040 for providing, for example, the application described in reference to FIG. 4 through FIG. 18.

Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 2005. The algorithm may be, for example, an algorithm that implements the process of FIG. 3 for predicting an anomaly in a subsystem of system.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method comprising:
   determining a first plurality of tags that are indicative of an operational performance of a subsystem of a system, wherein each tag of the first plurality of tags comprises a data series associated with a time period, and wherein the first plurality of tags are obtained from at least (i) a plurality of sensors in the subsystem and (ii) a plurality of sensors in the system that are not in the subsystem;
   processing measured values of the first plurality of tags with an autoencoder including generating a compressed representation of the measured values and de-coding the compressed representation of the measured values into estimated values of the first plurality of tags, wherein the autoencoder is trained on historical values of the first plurality of tags;
   determining a difference between the measured values and the estimated values in view of a threshold;
   predicting an anomaly based at least in part on a magnitude of difference between the measured values and the estimated values of the first plurality of tags; and
   providing one or more corrective actions for the subsystem based at least in part on the prediction,
   wherein the autoencoder is trained based on a dataset comprising historical values representative of normal operations of the subsystem, and wherein the autoencoder is trained such that the estimated values are similar or equivalent to the measured values of the first plurality of tags when the plurality of tags are captured during normal operations of the subsystem and the estimated values are poor estimations of the measured values of the first plurality of tags when the plurality of tags are captured during abnormal operations of the subsystem.

2. The method of claim 1, wherein determining the first plurality of tags comprises processing, using an unsupervised learning algorithm, data from sensors in the system to generate a plurality of groups of tags, the plurality of groups of tags comprising the first plurality of tags that are indicative of the operational performance of the subsystem.

3. The method of claim 2, wherein each tag of the first plurality of tags is correlated with at least one other tag of the first plurality of tags or with the operational performance of the subsystem.

4. The method of claim 2, wherein the unsupervised learning algorithm is a clustering algorithm comprising a k-means clustering algorithm, a cosine similarity algorithm, a topological data analysis algorithm, or a hierarchical density-based spatial clustering of applications with noise (HDB-SCAN).

5. The method of claim 1, wherein determining the first plurality of tags is performed offline.

6. The method of claim 1, further comprising, prior to determining the difference between the measured values and the estimated values, applying weights to each of the measured values and the estimated values.

7. The method of claim 1, further comprising dynamically adjusting the threshold during operation of the system.

8. The method of claim 1, further comprising determining whether a difference between the measured value of a respective tag and the estimated value of the respective tag meets a tag threshold and transmitting an alert if the difference meets the tag threshold.

9. The method of claim 1, wherein the autoencoder is a deep neural network or support vector machine (SVM).

10. The method of claim 1, wherein the historical values comprise data series collected in a time period during which no failures occurred in the subsystem.

11. The method of claim 1, wherein the system is one of a plurality of systems within a materials processing or manufacturing pipeline.

12. The method of claim 1, wherein the time period comprises a predetermined lookback horizon.

13. The method of claim 12, further comprising dynamically adjusting the predetermined lookback horizon.

14. The method of claim 1, further comprising generating a risk score for the subsystem based at least in part on the magnitude of the difference between the measured values of the first plurality of tags and the estimated values of the first plurality of tags.

15. The method of claim 1, further comprising transmitting an alert that indicates that the subsystem is predicted to experience the anomaly if the difference meets the threshold.

16. The method of claim 15, wherein the alert comprises a list of tags of the first plurality of tags that contributed most to the alert.

17. The method of claim 1, wherein providing the one or more corrective actions is performed using a trained machine learning algorithm, wherein the trained machine learning algorithm is trained on historical actions and corresponding responses by the subsystem.

18. The method of claim 17, further comprising, before providing the one or more corrective actions, optimizing the threshold at which the anomaly is predicted or detected, and predicting a failure mode associated with the anomaly using the trained machine learning algorithm.

19. The method of claim 1, wherein providing the one or more corrective actions is performed using rules-based logic to correlate observed patterns in tag measurements to known failure mechanisms for processes and equipment in the subsystem.

20. The method of claim 1, further comprising, after predicting the anomaly, providing a numerical risk score that indicates a likelihood that the anomaly will occur, wherein the numerical risk score is based at least in part on the magnitude of difference between the measured values of the first plurality of tags and the estimated values of the first plurality of tags or on how much the difference exceeds the threshold.

* * * * *